United States Patent
Plante

(10) Patent No.: US 10,706,648 B2
(45) Date of Patent: Jul. 7, 2020

(54) SYSTEM AND METHOD TO DETECT EXECUTION OF DRIVING MANEUVERS

(71) Applicant: SmartDrive Systems, Inc., San Diego, CA (US)

(72) Inventor: James Plante, San Diego, CA (US)

(73) Assignee: SmartDrive Systems, Inc., San Diego, CA (US)

(*) Notice: Subject to any disclaimer, the term of this patent is extended or adjusted under 35 U.S.C. 154(b) by 148 days.

(21) Appl. No.: 15/458,610

(22) Filed: Mar. 14, 2017

(65) Prior Publication Data

US 2017/0200333 A1 Jul. 13, 2017

Related U.S. Application Data

(63) Continuation of application No. 12/096,591, filed as application No. PCT/US2006/047042 on Dec. 8, 2006, now Pat. No. 9,633,318, which is a continuation of application No. 11/296,906, filed on Dec. 8, 2005.

(51) Int. Cl.
| | |
|---|---|
| *G07C 5/08* | (2006.01) |
| *G07C 5/00* | (2006.01) |
| *G06Q 10/00* | (2012.01) |
| *G06Q 40/08* | (2012.01) |

(52) U.S. Cl.
CPC .......... *G07C 5/0866* (2013.01); *G06Q 10/00* (2013.01); *G06Q 40/08* (2013.01); *G07C 5/008* (2013.01); *G07C 5/085* (2013.01); *G07C 5/0891* (2013.01)

(58) Field of Classification Search
None
See application file for complete search history.

(56) References Cited

U.S. PATENT DOCUMENTS

| | | |
|---|---|---|
| 5,505,076 A | 4/1996 | Parkman |
| 6,317,682 B1 | 11/2001 | Ogura |
| 6,429,773 B1 * | 8/2002 | Schuyler ................ B60R 25/04 340/425.5 |

(Continued)

FOREIGN PATENT DOCUMENTS

| | | |
|---|---|---|
| KR | 20000074416 | 12/2000 |
| WO | 2004066275 | 8/2004 |

OTHER PUBLICATIONS

History of the web browser, Wikipedia (Year: 2019).*

(Continued)

*Primary Examiner* — Peter D Nolan
(74) *Attorney, Agent, or Firm* — Esplin & Associates, PC

(57) ABSTRACT

The present invention relates to a vehicle recorder system that is configured with a video camera, a light weight memory system, and a radio communications facility suitable for use in conjunction with an moving vehicle. An automobile equipped with such video recorder system that is used throughout a day of service provides a video record of unusual events which may occur from time-to-time. For example, events such as accidents, near-misses, and excessive speed, among others, trigger a system to preserve video images collected before and after the moment of the event. Replaying these images provides information regarding the cause and true nature of the event. These systems are particularly suitable for vehicle fleets, or other groups of vehicles that can communicate with a common system.

18 Claims, 12 Drawing Sheets

(56) References Cited

U.S. PATENT DOCUMENTS

| | | | |
|---|---|---|---|
| 6,526,352 B1 | 2/2003 | Breed | |
| 6,553,308 B1 | 4/2003 | Uhlmann | |
| 6,954,689 B2* | 10/2005 | Hanson | G07C 5/008 340/438 |
| 7,027,621 B1 | 4/2006 | Prokoski | |
| 7,596,439 B2* | 9/2009 | Oesterling | G07C 5/008 340/870.07 |
| 7,904,219 B1 | 3/2011 | Lowrey | |
| 7,984,146 B2 | 7/2011 | Rozak | |
| 8,423,009 B2 | 4/2013 | Srinivasan | |
| 9,373,203 B1 | 6/2016 | Fields | |
| 9,610,955 B2 | 4/2017 | Palmer | |
| 9,715,711 B1 | 7/2017 | Konrardy | |
| 9,754,325 B1 | 9/2017 | Konrardy | |
| 9,767,516 B1 | 9/2017 | Konrardy | |
| 9,786,154 B1 | 10/2017 | Potter | |
| 9,792,656 B1 | 10/2017 | Konrardy | |
| 9,805,423 B1 | 10/2017 | Konrardy | |
| 9,805,601 B1 | 10/2017 | Fields | |
| 9,858,621 B1 | 1/2018 | Konrardy | |
| 9,868,394 B1 | 1/2018 | Fields | |
| 9,870,649 B1 | 1/2018 | Fields | |
| 9,942,526 B2 | 4/2018 | Plante | |
| 10,222,228 B1 | 3/2019 | Chan | |
| 10,360,739 B2 | 7/2019 | Palmer | |
| 10,404,951 B2 | 9/2019 | Plante | |
| 2001/0020902 A1 | 9/2001 | Tamura | |
| 2002/0135679 A1* | 9/2002 | Scaman | B60R 11/04 348/148 |
| 2002/0156558 A1* | 10/2002 | Hanson | G07C 5/008 701/29.3 |
| 2002/0170064 A1* | 11/2002 | Monroe | H04N 7/181 725/105 |
| 2003/0055666 A1* | 3/2003 | Roddy | B61L 27/0094 705/305 |
| 2003/0080878 A1* | 5/2003 | Kirmuss | B60R 11/02 340/936 |
| 2003/0081121 A1* | 5/2003 | Kirmuss | B60R 11/02 348/143 |
| 2003/0081122 A1* | 5/2003 | Kirmuss | B60R 11/02 348/148 |
| 2003/0081123 A1* | 5/2003 | Rupe | G07C 5/0891 348/148 |
| 2003/0081127 A1* | 5/2003 | Kirmuss | B60R 11/02 348/207.99 |
| 2003/0081128 A1* | 5/2003 | Kirmuss | B60R 11/02 348/207.99 |
| 2003/0081934 A1* | 5/2003 | Kirmuss | B60R 11/02 386/224 |
| 2003/0081935 A1* | 5/2003 | Kirmuss | H04N 7/18 386/327 |
| 2003/0095688 A1* | 5/2003 | Kirmuss | B60R 11/02 382/105 |
| 2003/0137194 A1* | 7/2003 | White | B60L 3/12 307/10.1 |
| 2003/0201875 A1* | 10/2003 | Kuo | B60R 25/102 340/426.18 |
| 2004/0008255 A1* | 1/2004 | Lewellen | G07C 5/0891 348/148 |
| 2004/0032493 A1* | 2/2004 | Franke | B60R 1/00 348/148 |
| 2004/0167689 A1* | 8/2004 | Bromley | G07C 5/008 701/29.6 |
| 2004/0257208 A1* | 12/2004 | Huang | B60R 25/102 340/426.1 |
| 2005/0038581 A1* | 2/2005 | Kapolka | G06Q 10/08 701/31.4 |
| 2005/0068417 A1* | 3/2005 | Kreiner | G07C 5/0858 348/143 |
| 2005/0083404 A1* | 4/2005 | Pierce | B60R 11/02 348/148 |
| 2005/0171663 A1* | 8/2005 | Mittelsteadt | G06Q 40/08 701/32.6 |
| 2005/0205719 A1 | 9/2005 | Hendrickson | |
| 2005/0243171 A1* | 11/2005 | Ross, Sr. | B60R 25/302 348/148 |
| 2005/0258942 A1* | 11/2005 | Manasseh | G07C 5/008 340/425.5 |
| 2006/0025907 A9* | 2/2006 | Kapolka | G06Q 10/08 701/31.4 |
| 2006/0158349 A1* | 7/2006 | Oesterling | G07C 5/008 340/870.07 |
| 2006/0259933 A1* | 11/2006 | Fishel | G08B 13/19647 725/105 |
| 2007/0088488 A1* | 4/2007 | Reeves | G07C 5/085 701/117 |
| 2011/0169625 A1 | 7/2011 | James | |
| 2012/0065834 A1 | 3/2012 | Senart | |
| 2013/0046449 A1 | 2/2013 | Yuecel | |
| 2013/0052614 A1 | 2/2013 | Mollicone | |
| 2013/0189649 A1 | 7/2013 | Mannino | |
| 2015/0015617 A1 | 1/2015 | Yeo | |
| 2015/0057512 A1 | 2/2015 | Kapoor | |
| 2015/0170428 A1 | 6/2015 | Harter | |
| 2016/0182170 A1 | 6/2016 | Daoura | |
| 2017/0301220 A1 | 10/2017 | Jarrell | |
| 2018/0025636 A1 | 1/2018 | Boykin | |
| 2018/0033300 A1 | 2/2018 | Hansen | |
| 2019/0176847 A1 | 6/2019 | Palmer | |
| 2019/0180524 A1 | 6/2019 | Palmer | |
| 2019/0389307 A1 | 12/2019 | Plante | |

OTHER PUBLICATIONS

Edwin Olson, A Passive Solution to the Sensor Synchronization Problem, the 2010 IEEE/RSJ International Conference on Intelligent Robots and Systems, Oct. 18-22, 2010, 6 pages.

Olson, E, A passive solution to the sensor synchronization problem, Intelligent Robots and Systems (IROS), Technical Fields 2010 IEEE/RSJ International Conference on, IEEE, Piscataway, NJ, USA, Searched (IPC) Oct. 18, 2010 (Oct. 18, 2010), pp. 1059-1064, XP031920438, DOI: 10.1109/IROS.2010.5650579 ISBN: 978-1-4244-6674-0.

* cited by examiner

SYSTEM AND METHOD TO DETECT EXECUTION OF DRIVING MANEUVERS

FIELD OF THE INVENTION

The present invention relates to vehicle event recorders. More specifically, the present invention is related to distributed vehicle event recorder systems that include networked portions coupled via the internet.

BACKGROUND OF THE INVENTION

Video surveillance systems are used to provide video records of events in locations of special interest. For example, retail banking offices are generally protected with video surveillance systems that provide video evidence in case of a robbery. While video surveillance systems are generally used in fixed location scenarios, mobile video surveillance systems are also commonly used today.

Video systems also have been configured for use in conjunction with a moving vehicle, for example, for use with police automobiles. As a police cruiser is frequently near the scene of an active crime, important image information may be captured by video cameras installed on the police cruiser. However, activity of interest occurring in the proximity of an automobile may not always be related to criminal activity. One example is a traffic accident, for which events and circumstances leading up to an automobile collision may be preserved so that an accurate reconstruction can be created and a more precise assessment of cause, fault and liability may be determined.

Accordingly, the use of video systems in automobiles is rapidly becoming an important tool that is useful not only for the protection of specific individuals, but also of the general public. Some examples of automobile video systems in the prior art are illustrated below.

U.S. Pat. No. 5,570,127 to Schmidt discloses a video recording system for a school bus that has two video cameras, one for an inside bus view and the other one for a traffic view, and also has a single recorder and a system through which the two cameras are multiplexed at appropriate times to the recording device. A switching signal controls which camera is in communication with the video recorder, so to view passengers on the school bus at certain times and passing traffic at other times.

U.S. Pat. No. 5,586,130 to Doyle discloses an invention for an apparatus and a method for detecting fault conditions in a vehicle data recording device, so to detect tampering or unauthorized access. The system includes vehicle sensors for monitoring one or more operational parameters of the vehicle. The fault detection technique contemplates storing a current time value at regular intervals during periods in which the recording device is provided with a source of main power. Also, U.S. Pat. No. 5,815,071 to Doyle discloses a method and apparatus for monitoring parameters of vehicle electronic control units.

U.S. Pat. No. 5,815,093 to Kikinis discloses a computerized vehicle log, based on a vehicle accident recording system that employs a digital camera connected to a controller in nonvolatile memory, and on an accident sensing interrupter. The oldest memory is overwritten by the newest images until an accident is detected, at which time the memory is blocked from further overwrites to protect the more important images, which may include important information about the accident. Kikinis teaches that the system may include a communication port, by which stored images are downloaded after an accident to a digital device capable of displaying images. In particular, images may be downloaded with a wired download to a server having specialized image handling and processing software thereon.

U.S. Pat. No. 6,002,326 to Turner teaches an antitheft device for an automotive vehicle having both an audible alarm and a visual monitor system. Video monitor operators are responsible for monitoring and handling an emergency situation and informing an emergency station.

U.S. Pat. No. 6,088,635 to Cox et. al discloses an accident video recorder for a railroad vehicle, which provides for a recording of the status of the railroad vehicle prior to an accident. A monitoring unit continuously monitors the status of the emergency brake and horn of the railroad vehicle. Video images are recorded and captured for a predetermined period of time after detecting that the emergency brake or horn blast has been applied as an event trigger.

U.S. Pat. No. 6,185,490 to Ferguson discloses a vehicle crash data recorder that is arranged with a three stage memory to record and retain information. The recorder is equipped with series or parallel hardwire connectors to provide instant on-scene access to accident data.

U.S. Pat. No. 6,246,933 to Bague teaches a system and a method for recording traffic accident data and for reproducing a traffic accident. A plurality of sensors register parameters of vehicle operation and include at least one vehicle-mounted digital video and audio camera for sensing, storing, and updating operational parameters. Re-writable, nonvolatile memory is provided by the microprocessor controller for storing the processed operational parameters, video images and audio signals. Data is converted to a computer readable form and read by a computer, so that an accident can be reconstructed via the collected data.

U.S. Pat. No. 6,298,290 to Abe et al teaches a memory apparatus for vehicle information data. A plurality of sensors, including a CCD camera, a vehicle speed sensor, a steering angle sensor, a brake pressure sensor, and an acceleration sensor are all coupled to a control unit, which transfers information to a flash memory and a RAM memory. The collected information collected is transmitted through a video output terminal. This video systems is data intensive, and a wired system is necessary to provide sufficient bandwidth for transferring large amounts of data.

U.S. Pat. No. 6,333,759 to Mazzilli teaches a 360° automobile video camera system. A complex mechanical mount provides for a single camera to adjust its viewing angle, generating a 360° range for video recording inside and outside of an automotive vehicle.

U.S. Pat. No. 6,389,339 to Just teaches a vehicle operation monitoring system and method. Operation of a vehicle is monitored with an onboard video camera linked with a radio transceiver. A monitoring service includes a cellular telecommunications network to view a video data received from the transceiver to a home-base computer. These systems are aimed at parental monitoring of adolescent driving. The mobile modem is designed for transmitting live video information into the network as the vehicle travels.

U.S. Pat. No. 6,411,874 to Morgan et al. discloses an advanced law enforcement response technology. A central control system provides the control for numerous subsystems associated with a police car or other emergency vehicle, driving a plurality of detector systems that include video and audio systems distributed about the vehicle.

U.S. Pat. No. 6,421,080 to Lambert teaches a digital surveillance system with pre-event recording, which is relevant in accident recording systems because detection of the accident generally happens only after the accident has occurred. A first memory is used for temporary storage, and images are stored in the temporary storage continuously until a trigger is activated that indicates an accident has occurred, causing images to be transferred to a permanent memory.

U.S. Pat. Nos. 6,389,340, 6,405,112, 6,449,540, and 6,718,239 to Rayner disclose cameras for automobiles that capture video images, both with forward-looking and driver views, and that store recorded images locally on a mass storage system. At the end of a day of service of the vehicle service, an operator inserts a wired connector into a device port and downloads information into a desktop computer system having specialized application software, so that the images and other information can be played-back and analyzed at a highly integrated user display interface. However, an administrative operator is not able to manipulate or otherwise handle the data captured in the vehicle at an off-site location without human intervention. Instead, a download operator must transfer data captured from the recorder unit device to a disconnected computer system. While proprietary 'DriveCam' files can be e-mailed or transferred through the Internet, the files are in a format that can only be opened by specific DriveCam software running at a remote computer. Therefore, a major disadvantage is that a human operator must service the equipment daily in a manual download action.

Therefore, vehicle event recording systems in the prior art are not structured to have system components located remotely from one another. At best, a manager workstation computer must be positioned in the vehicle parking facility, forcing that manager and all the users of the server to make use of the server at the parking facility. As a consequence, personnel requiring access to the recorded information must go to the server facility to receive that information, and even if data were transmitted by e-mail in proprietary digital formats, such data may not be in readable formats at the receiving ends, and time would be consumed to access those receiving computers.

Therefore, the systems in the prior art cannot be structured as distributed systems, limiting deployment due to the above described drawbacks.

SUMMARY OF THE INVENTION

It is an object of the present invention to provide a fleet management system based upon a vehicle event recording system.

It also is an object of the present invention to provide a vehicle event recorder system that includes a distributed network component.

It is another object of the present invention to provide a vehicle event recorder system that includes the internet.

It is a further object of the present invention to provide a fleet management system, in which automated reporting is enabled, so that a fleet manager can take specific actions in response to reports automatically generated by the system.

It is still a further object of the present invention to provide a fleet management system, in which a data analyst may be far removed from fleet vehicles.

It is still another object of the present invention to provide distributed fleet management services and applications, in which an insurance underwriter can process data captured by the system to manage risk.

It is yet another object of the present invention to provide a fleet management system, in which an automobile maintenance team can respond to conditions detected and reported by the system.

It also is an object of the present invention to provide fleet management system, in which a roadway or highway engineer can receive reports and alerts which relate to roadway conditions.

It is one more object of the present invention to provide fleet management system, in which government authorities can act upon data captured by the system.

These and other objects of the present invention are accomplished by apparatus and methods related in a distributed vehicle event recording system that are deployed in networks which may include the Internet. The vehicle event recorder system of the present invention finds applications in vehicle fleets and relates to video recording systems, communications networks, centralized server computers, and specialized application specific computer code to enable highly unique system functionality.

Fleet vehicles communicate with the server, and data exchange is automatically triggered in response to normal and common use of the vehicle without intervention by the driver or fleet manager. Vehicles returning to an appropriately arranged parking facility automatically connect to the server to download video data to the server, where it may be processed and further accessed by various interested parties. Such video data includes primarily scenes before a vehicle that are captured when the vehicle is involved in an event such as a traffic accident.

Vehicle fleet management networks are characterized as including at least one vehicle event recorder, a communication space formed from the combination of a vehicle parking facility and a wireless communications system, a network that may include the Internet, and an application specific server computer.

A vehicle event recorder includes a radio transmitter and is further coupled to the communication space by way of a proximity trigger, so that the presence of the vehicle in the communication space enables data transfer actions, by which video data is conveyed from the vehicle to a remote server for further use. The vehicle event recorder includes a camera, a microprocessor, a memory, a mobile wireless transceiver, a connection manager, and a proximity trigger. Video images captured by the camera are stored in a specially arranged memory buffer until the vehicle returns to a parking facility, where images are automatically transferred to a remote'server.

A communication space includes a parking facility, a fixed wireless transceiver, a network address server, a broadband connection to a communications network, and authentication systems. Upon arrival of an authorized fleet vehicle into the communication space, an enabled connection between the vehicle event recorder and the fixed wireless transceiver includes an authorization process. A vehicle suitably identified can then call a remote server via a proprietary data exchange method. Accordingly, servers include application specific software, a connection to a computer network, and web applications and web services arranged to cooperate with vehicle event recorders.

BRIEF DESCRIPTION OF THE DRAWINGS

The above and other objects and advantages of the present invention will become apparent upon consideration of the following detailed description, taken in conjunction with the accompanying drawings, in which.

DETAILED DESCRIPTION OF THE INVENTION

Figure 1:
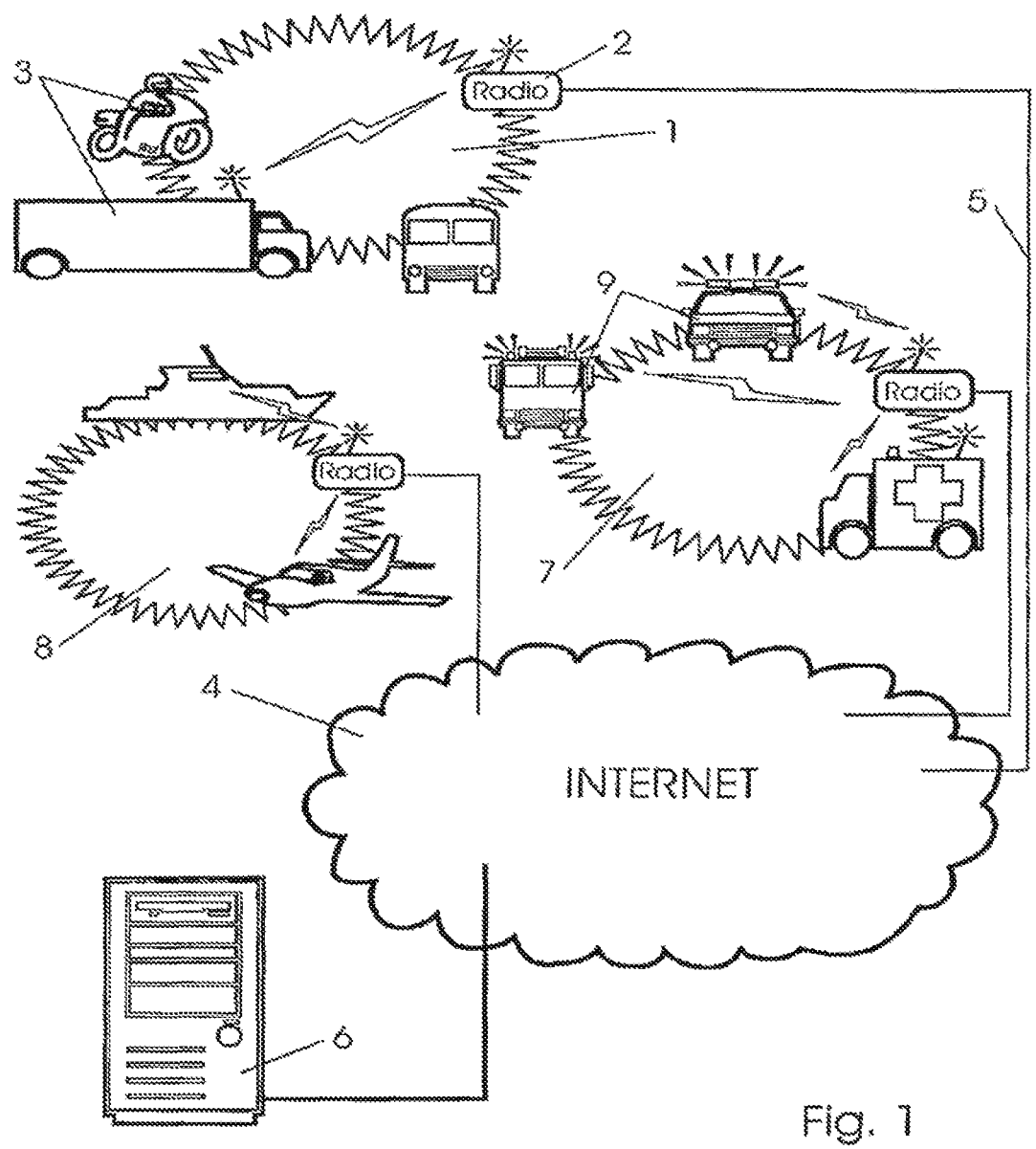
FIG. 1 illustrates schematically various types of fleet vehicles in respective groups, each in communication with a central server via the internet.

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated.

Vehicle Event Recorder: An electronic apparatus that may include video recording equipment, audio recording equipment, vehicle system sensors, environmental sensors, a microprocessor, application-specific programming, and a communication port, among others. A vehicle event recording unit is sometimes built into a small housing suitable for mounting to a common vehicle such as a truck, car, motorcycle, airplane, or ship. Some vehicle system sensors may not be contained within the housing of the vehicle event recording unit and may include electronic. Wireless, or wireline communication, for example a 'bluetooth' link.

Wireless Communication Space: A region in which a electromagnetic communication signals may be reliably received and transmitted by at least two communicating transceivers. The wireless communication space has a 'soft' boundary that is not defined to be some particular size at all times. However, a wireless communication space still is a discrete entity.

Fleet: A group of related vehicles. The relationship between vehicles in any one fleet is generally by ownership or management; however, other factors may connect the vehicles of a single fleet. For example, maintenance interests may cause several vehicles owned by independent parties to become part of a 'single fleet' for the purpose of the present systems. A 'fleet' may also be comprised of a single vehicle. While outside the traditional sense of the word fleet, a single vehicle fleet is fully included for the purposes of the systems discussed herein.

Proximity Trigger: A system devised to detect a prescribed proximity condition and provide an electronic signal in response thereto, the electronic signal being coupled to another system which may be set into action as a result of receiving the proximity trigger signal.

Event Trigger: A system devised to detect a predetermined physical condition and provide an electronic signal in response thereto, the electronic signal being coupled to another system that may be set into action by receiving the event trigger signal.

Parking Facility and Parking Lot: Any place that can accommodate temporary storage of a vehicle for at least a short period of time. It is not necessary that the vehicle actually stops nor fully engages a 'parked' status. A slow moving vehicle in a certain space, such as a specially configured 'download' lane, may be designated for the purposes of this invention as a 'parking facility'. Therefore, a parking facility/lot merely indicates a place that a vehicle might occupy while within range of a radio transceiver.

Download Space: An area over which a wireless communications link can be maintained between the radio transceiver of a vehicle event recorder and a fixed wireless transceiver. "Download Space" is also meant to include a facility, in which a vehicle can be temporarily accommodated (parked) while a communication link is maintained.

A vehicle event recorder system constructed in accordance with the principles of the present invention relates to at least one fleet of vehicles and includes a recorder unit that may be connected to a download space, a wireless radio having a broadband network connection, and a server computer system arranged to provide application specific functionality. Application specific functionality is provided as web services and web applications, which may be supplied from a remote server via TCP/IP transactions over a public communication network. In this event, proprietary protocols are adopted, in which microprocessors in vehicle recorder units make calls to and receive responses from remote servers.

Due to its highly mobile nature, a vehicle is not easily connected in a permanent manner to an information networks. While limited connection support may be envisioned, for example, via USB or fire-wire hardwire connection, or via a mobile telephone network, these connections have burdensome limitations which render such arrangements undesirable. Temporary hardwire connections require a human operator and significant daily overhead associated with a download strategy. Mobile telephone networks have bandwidth limitations and reliability issues which prevent the use of these connections in the manner required by certain high performance applications.

In a system according to the present invention, a vehicle enters a communication space having wireless coverage that enables the vehicle to be connected to the server and communicate therewith. The relationship between the vehicle event recorder and the communication space is such that mere entry of the vehicle establishes the communications link and initiates at least a download transaction. Accordingly, an operator need not carry a laptop to each vehicle and initiate a physical connection.

Referring to FIG. 1, the communication of an independent fleet of vehicles with a centralized server by way of a highly distributed network such as the public internet is described. Communication space 1 is the region of space covered by wireless communications radio service. For example, when a communications link comprises a 'WiFi' type radio transceiver 2, reliable communication may be sustained only over a limited range, which may be approximated by a sphere having a radius of a few hundred feet. Therefore, a common parking facility such as a small parking garage may be served by a WiFi radio system, which is large enough to cover fleets of a few dozens of vehicles all parked in a common parking location. Accordingly, these systems include cooperation between a storage location for vehicles and a wireless data communications link; that is, the range of transceivers is configured to envelope and surround the appropriate vehicle storage location.

Thus, the extent of wireless communication space 1 is defined by and served by wireless radio transmitter 2, which broadcasts radio signals into the space. When a specially configured mobile computer installed within a prescribed fleet vehicle 3 enters the communication space, the computer detects this condition. Upon detection that a signal is present (that a vehicle has arrived in the communication space), the computer makes a communication connection and performs a 'handshaking' which includes a network address assignment, for example, from a radio or router service arranged as a network address server. Once the mobile computer has a network address, it is ready to communicate directly over the internet 4 and with network nodes similarly connected. The radio is preferably connected to the internet by broadband connection 5, for example a digital subscriber line DSL or cable or fiber type connection or a mix of these high-speed systems. Finally, as a network endpoint, application specific system server 6 is comprised of programs suitable for communicating with a plurality of vehicle event recorder units and a plurality of communication spaces, which may be widely and remotely distributed.

Various vehicles 3, including trucks, motorcycles, buses, etcetera, together form an example of a fleet. A fleet is generally a group of cars which are somehow interrelated. A fleet may be comprised of a plurality of vehicles such as the school buses of a single school district. Fifty buses may form a fleet of vehicles with a common owner, administrative staff, physical management facility and parking lot. Accordingly, a school bus vehicle fleet is ideally suited for an embodiment of this invention.

Any particular fleet may have associated therewith a parking lot or other storage area, to which fleet members are returned each night after a day of service. In one embodiment, such parking space is equipped with a radio transceiver or radio transceiver network, so that all vehicles connect to communicate with the internet upon their arrival at the parking facility. Thus, a vehicle storage location is combined with a suitably arranged transceiver, which envelopes the vehicle storage location in communication space 7. Radio transceivers form a communication envelope, which surrounds a parking facility, whereby returning vehicles pierce the envelope boundary as they enter the parking facility and a reliable communications connection to the internet is automatically initiated after the vehicle enters the communication space. Application specific computer programming code running on the vehicle event recorder enables the vehicle event recorder to contact a remote server and perform transactions therewith. Thus, a driver need not manually set, trigger, connect or enable any actions. In fact, the driver need not even be aware of the existence of the system and of its operation. A driver merely has to return the car to the parking lot to cause a communications connection to be enabled automatically.

While the embodiment described in detail herein is on that includes fleet members of the type characterized as 'motor vehicles', i.e. cars, motorcycles, trucks and buses operated on streets and highways, this embodiment is not limited to those kinds of vehicles, but can also serve vehicle systems which are not automobile-type vehicles.

For example, download space 8 can be arranged, in which yachts enter that space to cause an automated communications connection. A harbor can support a fixed WiFi transmitter and high-speed internet connection, through which all boats entering the harbor are enabled with communication to a server. Under this arrangement, a harbor is a 'parking facility'.

Similarly, airplanes that approach an appropriately equipped gate come into contact with the system server that can download information recorded during the service of that aircraft aircraft. A restrictive meaning should not be associated with the term 'vehicle' to conclude that only cars are being considered herein.

As described, vehicles equipped with event recording units automatically establish a wireless communications link with a remote application server that is configured to communicate with the vehicle event recorders upon entering predetermined communication spaces. There is no longer a need for a human operator to engage a vehicle to establish a physical connection by way of a mechanical plug-in device and system, to remove and exchange tapes from tape recording type systems, and to manually perform a download step, or an on-site fleet IT manager to be involved in any way.

Independent fleets of vehicles, which are maintained, owned and operated by independent parties, may similarly be in communication with the same server. A separate communication space 7 which may be remotely located with respect to another communication space 8, serves an entirely different and unrelated fleet. For example, when public authorities operate and maintain a fleet of emergency vehicles 9, these vehicles may enter communication space 7 to activate a communications link, whereby data recorded by recording unit can be downloaded to the centralized server. This communication space may be a parking lot associated with city vehicles. It may also be the same parking lot that is appropriate for storage of vehicles overnight. This way, the vehicle operator returns the car to the lot at night for storage, and without taking any further act causes data to be downloaded to the remotely located server. Thus, the lot only need be equipped with a WiFi transmitter connected to the internet, and it is no longer necessary to maintain a computer on-site. Such architecture frees fleet information technology managers from the need to be in the same location as the fleet vehicles. It is no longer necessary to maintain a strong IT capacity at the same location where the vehicles are stored. A 'smart' parking lot only needs to be equipped with very inexpensive WiFi radio transmitters and a broadband connection to the nearest Internet service provider.

Figure 2:
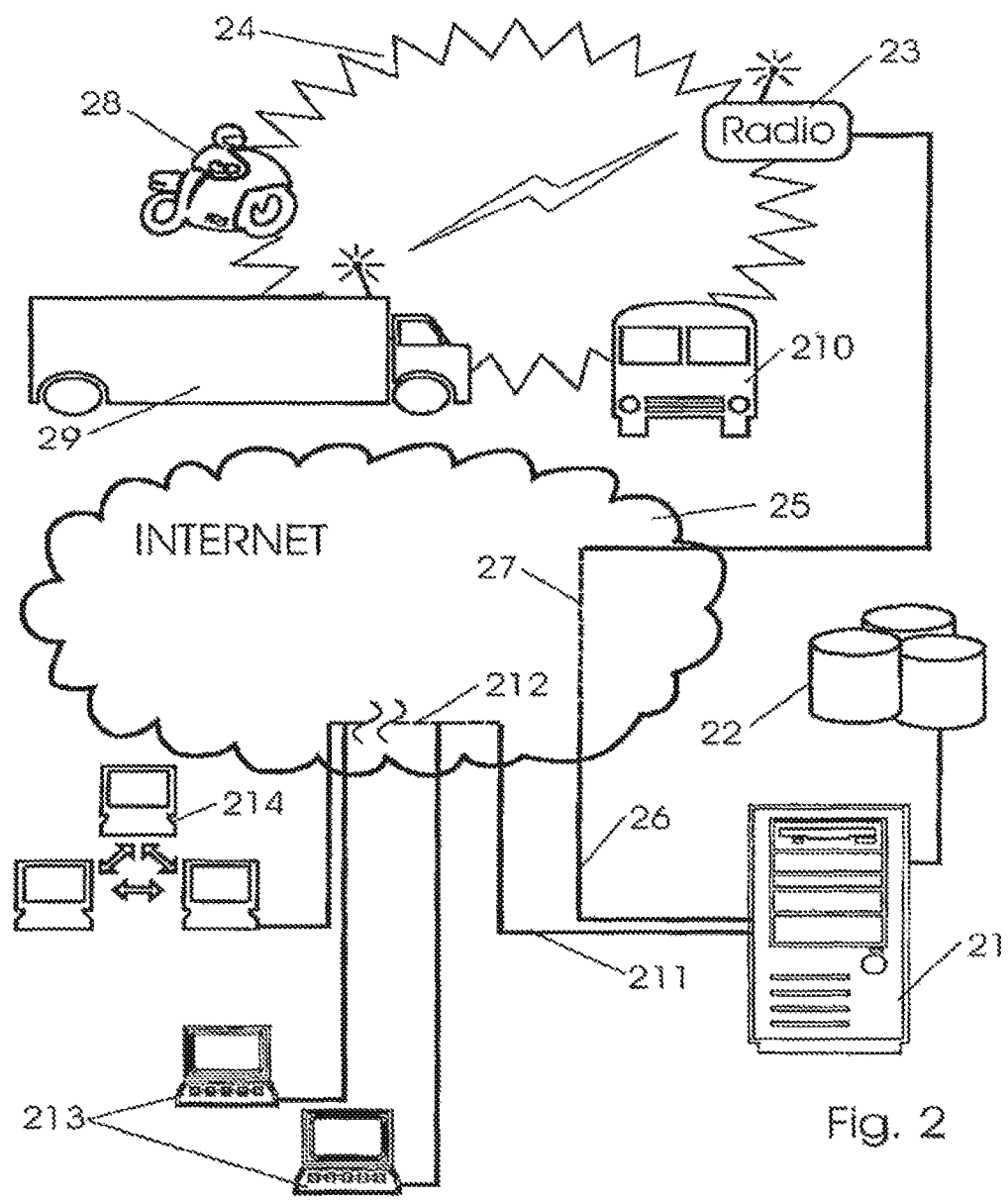
FIG. 2 illustrates in greater detail a facility in which fleet vehicles are in communication through the internet.

Referring now to FIG. 2, an architecture including additional system elements in communication with a vehicle event recorder network is shown in greater detail. In particular, server 21 having a defined and fixed network address associated therewith is in communication with mass storage database 22, and is further coupled by way of the internet to a wireless radio transceiver 23. The transceiver has a useful range which defines the extent of communication or download space 24.

One skilled in the art will appreciate the advantages of having the internet situated between the architecture endpoints, i.e. the server or database network node and the vehicle recorder unit network node. As fleet vehicle storage and information technology professionals and offices are sometimes not in the same location, efficient communication over long distances has to be provided. Moreover, because the data collected for this system is useful to different independent and distributed parties, is similarly useful to access to the data over highly distributed networks that include the Internet.

While the internet is a public system, it also can be used for highly secure and private transmissions of information.

For example, link 26, dedicated to the application at hand, may permit the server to communicate privately with known system members. In some instances, this can be achieved by way of a virtual private network or VPN 27. It is also possible to simply arrange communications over the public network, in a coded fashion only understood by the server and the vehicle event recording units aboard vehicles 28, 29 and 210. Each of these vehicles, being qualified members of the system, exchange digital transactions with a prescribed server. An unauthorized computer attempting to communicate with the server could not properly form requests without prior knowledge of the services and communication protocols available on the server. Thus, the server's private services would not be easily accessible to non-members.

The server connected to the internet is widely available to all systems similarly coupled to the internet, without regard to location. Thus, web applications may be served to authorized users by the same server along communication path 211. As the server is connected to the internet in this manner, any number of users may establish communication 212 simultaneously with the server. Individual managers operating remote workstations 213 can view web applications provided by the server and interact therewith from any location in the world. Thus, an administrator of recorded vehicle video information needs no longer to be present at the vehicle or at the vehicle's parking facility, which had previously been near in distance or co-located with the location where the vehicle fleet is stored during the night.

A parking facility may include an IT office with a download workstation running desktop applications. The entire remote intranet 214 of a company of a number of employees may be similarly connected and in communication with a server and database, holding data captured by a vehicle event recorder. Because the data gathered by a vehicle event recorder is useful for employees that are not a top level fleet administrator or manager, other parties interested to vehicle use and management no longer have to receive raw data by unmanaged e-mail transmission, or visit a physical site where a vehicle is parked, nor rely on human operators to download data from the necessary vehicles each day when the vehicle arrives at its storage facility. When vehicle event recorders are coupled through automatic downloads to high power servers connected in a shared network relationships, information is processed more efficiently and results in a system of greater functionality and processing power.

Another important strategy permits system members, for example computer programs in recorder units, to consume 'web services,' computer services or programming functionality. The programming functionality is not available to outside systems, nor there are any visible components or a human interface to the web services, which are provided for computers to interact with computers. Thus, a vehicle event recorder unit in a vehicle, which is in a predetermined communication space, may call a computer function which resides and is executed on the remote server. Thus, very large processing power and database capacity is available at the same time at a relatively small computing facility associated with a vehicle event recorder unit, obviating the need for a computer workstation at the parking site.

Another advantage to having the internet as part of system architecture relates to customer interaction from various locations. Interested parties may not be located in a common place with download and server facility, partly because many unrelated parties may have an interest in the same data. For example, insurance underwriters may be interested in reviewing driving histories, and it would be overly burdensome for insurance underwriters to review driving records at a fleet facility.

Because of the nature of vehicle fleets and of the activity associated therewith, it is sometimes necessary to provide a different system architecture. In particular, special circumstances may arises in the situation where a large number of fleet vehicles returns to a lot at approximately at the same time. If a server computer is separated from the vehicle fleet by a link of limited bandwidth, excessive data traffic will prevent properly organized downloads from all vehicles. As it is physically impossible to provide links of unlimited bandwidths, a local buffer may be deployed, which is arranged to receive and hold a massive amount of video data from all returning cars and to later transfer that information over time to a server is an improved arrangement.

The problem is exacerbated when fleet 'turn-around time' is short, for example, in a taxi or police fleet, where the vehicles are used on multiple shifts with various drivers. In this situation, it is impossible for the server to download data from one vehicle at a time in a serial operation, because the vehicles in the download queue will tend to return to service before their download operation may be completed.

Figure 3:
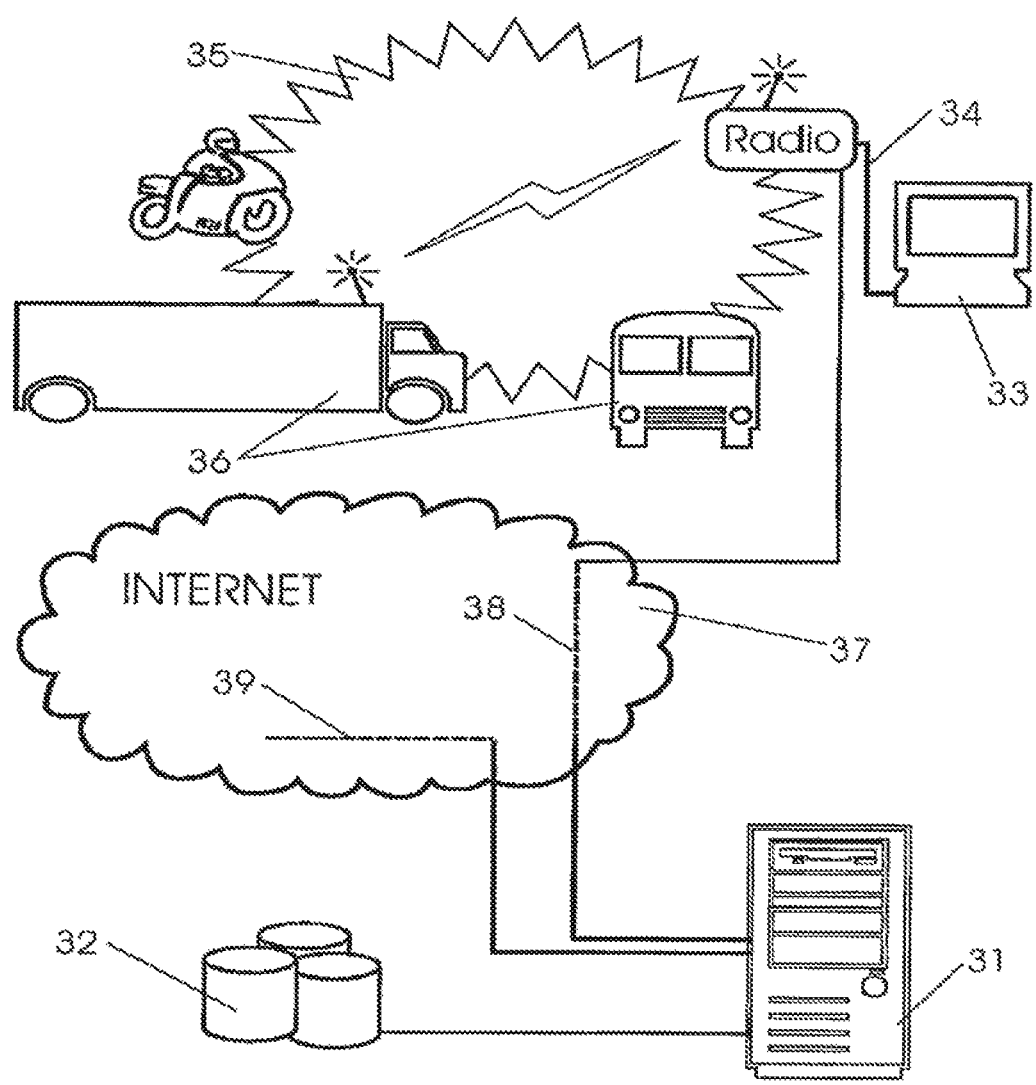
FIG. 3 illustrates an embodiment that includes a 'store and forward' preprocessing station.

An alternative system architecture configuration is described in FIG. 3, and includes a dedicated workstation computer co-located at or near the facility where vehicles are stored. The dedicated workstation computer includes specialized data management services and provides fast download, store and forward functions, scheduling, and authorization administration, among others. In some instances, it is preferable to include a very high speed downloading service on site at the parking facility. This is particularly the case when several vehicles arrive simultaneously, for example at a shift change. Since not all broadband connections to the internet are sufficient for quick transfers of very large quantities of data, in some cases a workstation computer configured should be configured for authorization and authentication processes, to receive at very high speeds information including video data from arriving vehicles, for buffer storage of that data, for data queue management, and for further transferring data to a centralized server at a later time.

Accordingly, FIG. 3 shows server 31 properly coupled to mass storage database 32. By properly coupled, it is meant that provision is made for fast, frequent, and efficient exchange of data. To this end, not only is bandwidth very high, but the programming between code running on the server and code running in the database are tuned with respect to the application at hand and formed in conjunction with one another. The server is connected via the internet to workstation 'store and forward' buffer computer 33, which is co-located at the parking facility where fleets vehicles are stored. The workstation computer is in communication with the WiFi wireless transmitter via very high speed communications link 34 that provides communication space 35, into which arriving vehicles 36 may be received. Such download may be completed in a very short period of time. Data is passed wirelessly from a vehicle event recording unit to the WiFi transmitter, and thereafter to the workstation computer. Data is temporarily stored at the workstation computer, and is later transmitted through the internet 37, then over modest bandwidth private link 38, and finally arrives at server 31 and database 32. This server provides web services and web applications to wide audience 39, which may utilize these services and application anywhere where internet access is available. In this manner, data collected by fleet vehicles is made available to widely distributed interested parties.

The premise of these embodiments lies in fleet vehicle management strategy. As such, one system endpoint is a vehicle event recorder which is suitably affixed and mounted within a common vehicle especially an automobile. These devices may be a permanently affixed within vehicles and will soon be provided as standard equipment. Electrical couplings such as power supply and data connections with the vehicles electronic systems may be made through standard connectors and interfaces. These devices are thus coupled to the vehicle and its systems. They are further coupled to the vehicle whereby an optic axis of a camera is aligned to provide images of events occurring about the vehicle. In some versions a second camera has a field-of-view includes the space which contains the vehicle operator. A single vehicle event recorder may be provided with a plurality of cameras and corresponding number of image spaces. Thus some vehicle recorder units contain two cameras, one pointing forward and one pointing toward the operator spaces.

These devices are sometimes arranged to be completely self-contained and require as little mechanical connection with vehicle systems as possible. For example, it is necessary to have a good mount, which provides that the optical axis be aligned with desired fields of view; however, it is not a requirement that the device be integrated with a vehicle computer or other vehicle hardware.

Figure 4:
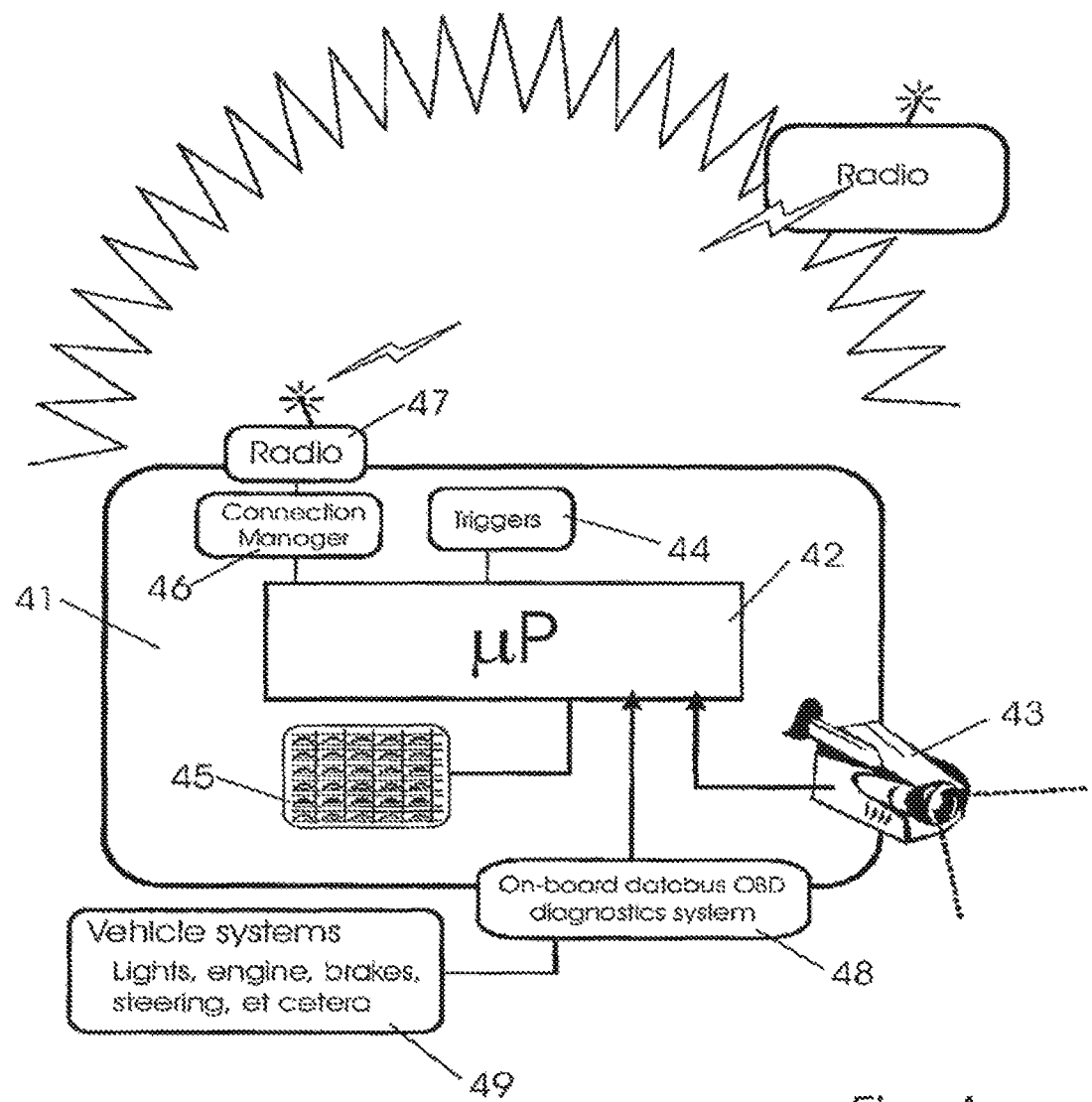
FIG. 4 is a block diagram of a vehicle event recorder unit suitable for use in an automobile.

The head portion of a vehicle event recorder system is shown in greater detail in FIG. 4, which illustrates vehicle event recorder head 41 in block diagram form. The primary elements include microprocessor 42 including application specific computer code, electronic video camera 43, event triggers 44, memory buffer system 45, connection manager 46, and radio communication system 47. In some versions, an on-board data bus, OBD, diagnostics system 48 is included. Such OBD systems are coupled to sensors at vehicle subsystems 49 such as lights, engine, brakes, and steering, among others, to provide feedback as to the state of those systems, which may yield further information in conjunction with video data related to causes of events being recorded.

Vehicle event recorder systems are built about a microprocessor suitable for use in computing platforms for self-contained electronic apparatus. In most cases, these microprocessors are not arranged as general computing platforms, but rather with application specific firmware directed to particular functions at hand. These processors support the ability to perform application-specific functions and drive complementary subsystems such as memory, input/output ports, network connections, video input, and event triggers, among others.

Particularly worthy of mention among these functions is 'event handling', wherein an event trigger causes execution of a computer routine and an image or image series collected by a camera is transferred from a temporary short-term buffer memory to a durable and lasting memory, where it may be stored for a considerable period of time. Thus, the microprocessor is responsive to an event trigger such as an accelerometer and a predetermined threshold, which detects abrupt movements and sets the microprocessor into action to transfer stored data from one memory to another.

Further, the microprocessors of vehicle event recorders are arranged to support wireless connections and data exchange with authorized networks. In particular, the microprocessor is coupled to a proximity trigger which is toggled whenever the vehicle event recorder enters a prescribed communication space. Upon detection of such proximity condition, the microprocessor attempts an authorization step whereby the identity of the network and vehicle event recorder are checked and verified.

If the vehicle event recorder is identified as one properly located within an authorized download space, the microprocessor continues with a data transfer or download step, in which information stored in the memory of the vehicle event recorder is transferred wirelessly to either a server or to a 'store-and-forward' workstation for later transmission into the broader systems network.

After a completed download, error checking and confirmation steps permit the microprocessor to complete the connection to proceed with a disconnect operation.

The functions including connection detection (sometimes called 'proximity detection'), network address client, authorization, download, disconnect, among others, are sometimes arranged as part of a connection manager module.

An electronic video camera may be arranged such that it has a field-of-view which includes an environment about a vehicle. For example, the forward space ahead of a car is an area generally of great importance in consideration of accidents which occur from time-to-time. The camera is further coupled to the microprocessor and image buffer, so that images captured by the camera may be discarded when it is determined that those images are no longer of importance, or in the opposing case, saved to a durable memory when it is determined the images are associated with an important event.

This type of video cameras is arranged to continuously capture video images both before and after an accident, should one occur. Thus the cameras are durable and fixed mechanically in a vehicle, so that they can survive the impact associated with a collision. While in most cases it is anticipated the camera will be affixed within the driving compartment, an alternative includes mounting cameras on the exterior the vehicle, for example, at a rooftop or coupled with a bumper. The camera is in electronic communication with the microprocessor, whereby the microprocessor operates to drive camera functions.

Event triggers include means for sensing an important event and in response thereto activating the microprocessor to perform save operations, preserving images associated with the detected important event. Event triggers may be arranged about various systems including an on-board data bus, accelerometers, a panic button, or a time interval trigger. An onboard data bus may be arranged as an event trigger when some measured parameter exceeds a prescribed threshold to indicate the occurrence of some condition. When the threshold is exceeded, an electronic signal can be provided to the microprocessor queuing it to handle images accordingly. Alternatively, accelerometers can detect very strong movements such as a car swerving or breaking excessively hard, or a direct collision. In these situations, the events may be declared important and the accelerometer will provide the signal upon which the microprocessor will act to preserve images recently captured and those captured soon after the event.

A 'panic button' type event trigger may be arranged as a tactile switch, which a user can engage when the user makes a judgment that an event has occurred. When a driver sees some relevant activity, she can engage the panic button to cause an image save operation. An event trigger may be as simple as a mere timed interval. After a certain period of time has elapsed, an image save operation can be executed. In this case, the mere passage of time causes a signal, which sets the microprocessor into action to save images.

Vehicle event recorders in these embodiments include important memory systems. Preferred memory systems include those having a managed loop buffer, where images are temporarily stored for brief periods of time. When an event occurs, trigger toggle images are transferred to a second more durable memory from the managed loop buffer, thus preserving images associated with the event. In some versions, the managed loop buffer is embodied as a semi-conductor memory such as a DRAM memory, which is quite fast and may be written to many millions of times without exhausting its functionality. In the same system, the durable memory may be fashioned from a flash memory system suitable for holding large amounts of data, including video type data. Said flash memories are very inexpensive and have suitable capacity for holding video information associated with a large plurality of separate events, which may occur throughout the service day of a vehicle event recorder.

Wireless communications radios in wide use today include those known as WiFi transceivers. A WiFi transceiver is very inexpensive radio, which generally includes network functions such as network address handling services, router services, firewall services, and network switching, among others. Thus, it is an advantage of these systems to deploy WiFi type transceivers, so that a vehicle entering a parking facility can be automatically connected to a cooperating network.

New, soon to be introduced, systems boast far greater range than those WiFi systems; for example, "WiMax" systems will have range of a few, perhaps tens of miles. It is useful in some embodiments to arrange WiMax transceivers in conjunction with a parking facility in a vehicle event recorder system. In either case, a wireless communications transceiver has a finite and limited range, which gives rise to a coverage region or communication space and some implicit peripheral boundary. While we use herein WiFi and WiMax systems as examples, it will be recognized by a person skilled in the art that many alternative wireless systems are available, some which might be used in place of a WiFi or WiMax system. WiFi and WiMax have been described here because of their adequate performance characteristics and very low-cost.

In addition to these subsystems, the vehicle on-board data bus system or OBD is also coupled to the vehicle event recorder microprocessor. An on-board data bus is an electronic system coupled to a plurality of transducers and sensors throughout the vehicle, each of which collects data related to vehicle characteristics and performance. The on-board data bus may include information about drive train and transmission, engine operational status, brakes, lights, et cetera. The on-board data bus is useful in vehicle event recorders for providing additional data and information, which relate to the status of a vehicle, subsystems and engine conditions at a particular time of interest, for example in association with a traffic accident.

Figure 5:
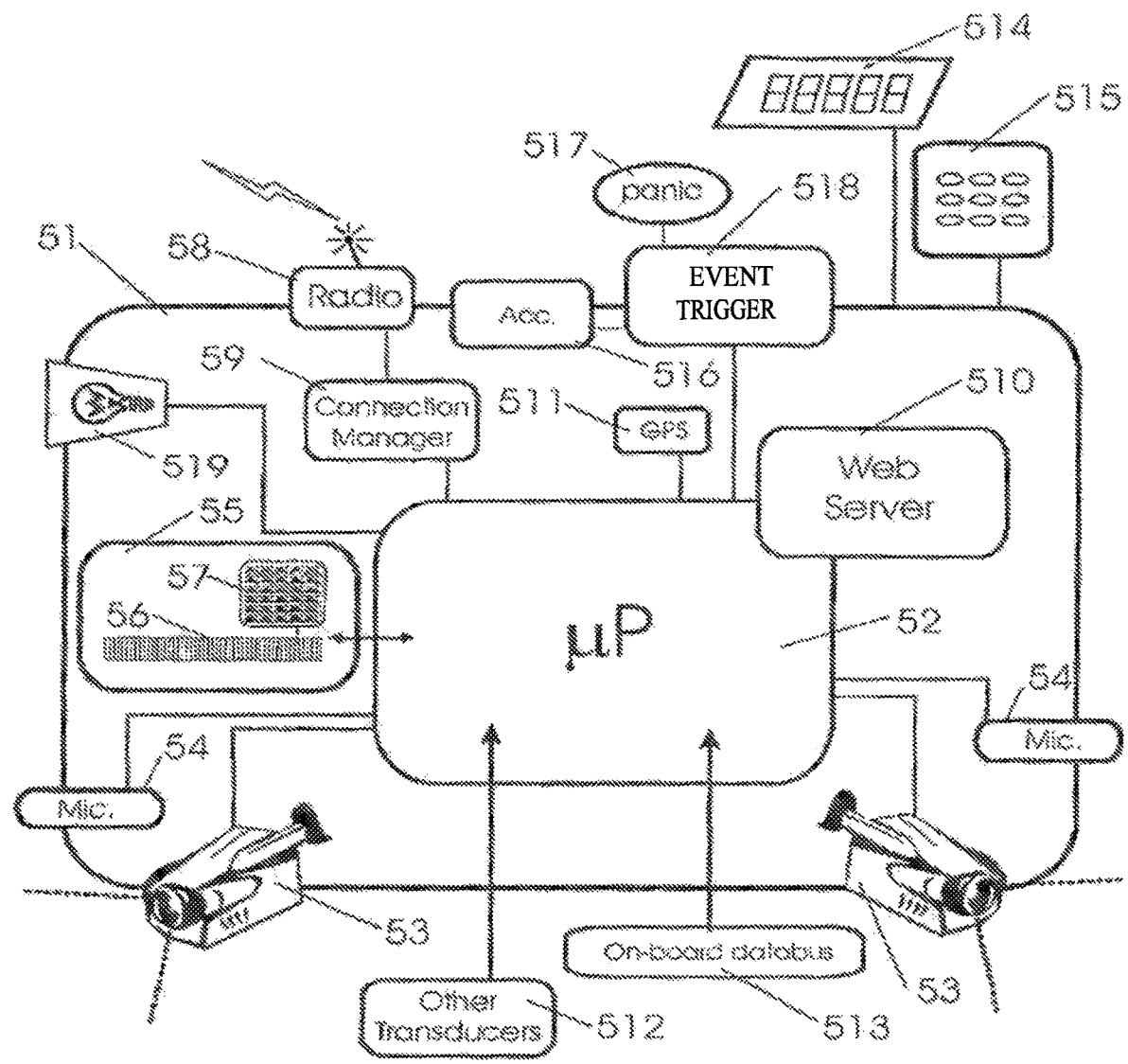
FIG. 5 is a block diagram illustrating elements of a vehicle event recorder unit.
Figure 6:
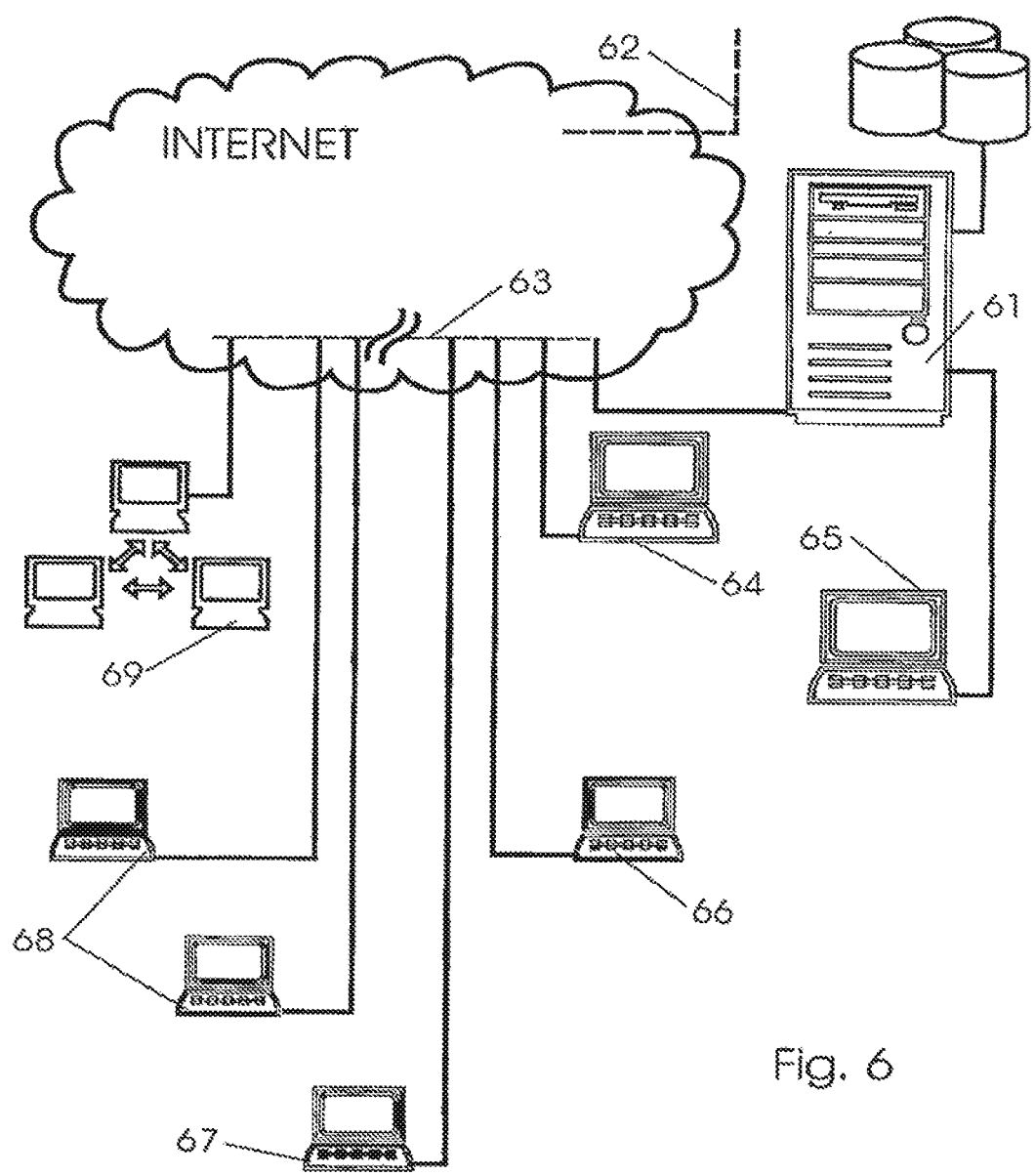
FIG. 6 is a schematic representation of cooperative systems forming a network relationship with recorder elements.

Subsystems of vehicle data recorders may include additional optional elements. Some of the most important of these optional elements are illustrated in the block diagram of FIG. 5 alongside with the primary elements. Data recorder unit 51 comprises computer microprocessor 52 with appropriate vehicle event recording management programming installed. Two cameras 53 include a forward-looking camera and microphone 54 and a driver compartment camera and microphone. Advanced high performance memory system 55 includes a two-stage buffer of managed loop memory 56, and flash memory 57 is provided according to attributes and the nature of these systems and applications. Radio 58 provides a wireless communications link in conjunction with connection manager 59, which couples the microprocessor to systems external to the vehicle event recorder head. Internal web server module 510 runs within the device to provide an hypertext transfer protocol interface, whereby internal adjustments to subsystems may be effected via remote web browsers. Some embodiments include position determining means 511 such as a global position system GPS locator. Other sensors and transducers 512 may be deployed about a vehicle to measure parameters related to vehicle performance, independent of those transducers that are already a part of the on-board data bus system. In addition, data collected from an on-board data bus directly coupled to the microprocessor provides similar functionality.

Graphical user interface 514 provides a visual means of conveying messages and information to a human operator. User tactile input means 515 such as a keypad may also drive activity within the vehicle data recorder head. Event triggers 518, including accelerometers 516 and panic button 517, are arranged to indicate to the microprocessor the occurrence of an instant event and the need to preserve images associated therewith. Finally, internal illumination system 519 is provided for nighttime use.

In some versions, a forward-looking camera and exterior microphone are arranged to record video and audio information outside the vehicle compartment. Conversely, a vehicle event recorder system may additionally deploy a second camera as a vehicle driver compartment video camera and second microphone as an interior microphone, arranged to record video and audio inside the driver compartment. Thus, it is said here that vehicle event recorders include at least one camera, but may also include any number of auxiliary cameras and microphones.

In some embodiments, a vehicle event recorder may be provided with a very large capacity memory system such as a disk drive unit. A so-called 'microdrive' can be arranged as a very small memory system capable of recording video data over extended periods. All driving activity throughout a service day, including service days with no accidents, may be of interest in some system versions. Thus in the present embodiments, a recorder is started in the morning at the beginning of the service day and operates to continuously deliver data to the memory until the end of the service day, when the vehicles are returned to the storage facility. All recorded data including non-accident or non-event related data is put into memory and downloaded at the end of the day. This way, the vehicle event recorders of these embodiments completely omit accident triggers that manipulate data storage systems, so to prevent overwrite of memory.

In other embodiments, a computer module known as a 'web server' may be included, so that a vehicle event recorder that has established a communications connection may be addressed and manipulated by way of a common computer internet browser. Thus, a vehicle event recorder present in a communication space may be 'browsed' by remotely located systems operators. It is possible in this manner to reset or to otherwise manipulate various adjustable settings which may be within the vehicle event recorder. It is not necessary to physically access the vehicle event recorder with a screwdriver for example, in order to change the brightness or contrast of the video system. Instead, an operator located in India may adjust the brightness of a particular vehicle after noticing problems in a video analysis operation being taken up far from the vehicle location. While updated firmware downloads can provide the same function, a web browser provides a highly functional user interface front end which is easily operated by anyone who can operate a computer.

A recorder unit may be equipped with GPS receiving system 511. At all times, a GPS receiving system can provide a position signal to the microprocessor for recording. Position determination results can be recorded by these versions of vehicle event recorders to associate measured location with accident video. Further, the system sometimes includes an electronic compass device, which can measure the direction of a reference axis associated with the vehicle. Thus, one can tell precisely in which direction the vehicle is pointing at various recording intervals and this information can be similarly recorded.

It is also possible to incorporate other transducers, which are coupled to the vehicle in some way to measure physical parameters of the vehicle or its environment. These transducers might be coupled to the processor directly and connected to one or another vehicle subsystem. For example, a drive shaft pickup might include a magnet which the detects every turn of the drive shaft. This information could yield indications as to vehicle speed, which are important during accident review.

Some versions of these vehicle event recorders include a graphical user interface in the form of a display unit, suitable for converting electronic signals provided by the microprocessor to graphical messages easy to read and understand by human users. After properly logging in, a driver may receive a message reminder to "drive safely" on such displays A tactile keypad is provided in some versions in order to allow users to provide inputs to the Microprocessors. Where fleet vehicles are shared by several drivers, it is useful to provide means for a driver to identify herself to a system by way of a touchpad code or PIN number. As such, vehicle event recorders may sometimes be provided with such keypad input devices suitable for these functions.

For nighttime use, or in other no or low light level conditions such as when the vehicle enters a tunnel, these vehicle event recorder units may include integrated IR illumination system 519, providing illumination in the driver compartment that does not distract the driver. Infrared light is detected by the video camera but cannot be seen by the driver. Accordingly, the infrared light does not distract the driver.

In some circumstances, wireless mobile phone networks may also be used for the communication link in special versions of these systems. In this regard, the wireless communication space boundaries are defined by the extent of the cellular network coverage. Since mobile phone network systems are relatively mature, the coverage area attainable is considerable. Accordingly, vehicle event recording systems arranged in this fashion may have a wireless communication space of considerable extent, covering tens or even hundreds of square miles.

Video frames selected from a series may also be transmitted. For example, while recording locally at a rate which far exceeds one frame per second, one could transmit at less than that rate over the limited bandwidth wireless telephone network. Thus, the system could convey image information albeit in limited quantity, resolution or rate.

In systems deploying a mobile telephone network as a communication link, the 'proximity trigger' described above becomes somewhat ambiguous, because the vehicle rarely leaves and reenters communication space and may remain continuously therein during the entire service day. In the embodiments described above, a vehicle's entry of the download space is the trigger which causes a download action. However, such triggers are ineffective when mobile telephone networks are used as the communications link Considering now the opposing node of these networked vehicle event recorder systems, reference is made to the portion of these network systems that includes the server and data consumer clients. In particular, reference is made to server computer 61, which communicates by way of the internet with a plurality of prescribed and authorized member entities. While data is received from vehicle event recorders along paths 62 from remote recorder units as previously explained, it is relevant to how such collected data is distributed, analyzed and consumed.

Recorded information which bears indication and history as to the use and abuse of vehicles is important to a number of interested parties. For example, a fleet administrator/manager keeps track of vehicles and drivers he manages not only for maintenance and safety purposes, but also with respect to scheduling and loss prevention, among others.

A fleet administrator/manager working from workstation 64 located in any part of the world can interact with web applications served by the server to manipulate and examine data recorded by any of the fleet vehicles. Web servers can be arranged to provide a fleet manager access to vehicles under her specific management only and to restrict access to the information collected by vehicles under the management of an independent entity. Thus a single server can be used by completely independent entities who manage different fleet vehicles. No other system known in the arts has a single server which can receive information from various vehicles belonging to different fleets, sort that information accordingly, and restrict its access to the appropriate authorized parties. Thus, in a municipality, a vehicle maintenance department can subscribe to the service by way of the internet in parallel with the fleet manager of a private fleet operation. While the two users know nothing of the other, they share a common server, database and service provider, thereby reducing costs for all.

The server/service provider might include high security level administrative workstation 65, which has a direct private connection and unique credentials to the server. A service administrator, requiring high-level administrative privileges to the server, may be connected on the inside of a strong firewall. Such administrative node is not appropriately exposed over the Internet for security reasons.

Applications consumers 66-69, include network nodes which communicate with the server by way of its applications and services. Special applications may be configured for different particular users or data consumers. Some of these special purpose applications are illustrated hereinafter.

Insurance adjusters and underwriters use advanced data analysis to better position themselves with regard to risk management. Presently, reports and statistical analyses available to insurance adjustors and underwriters are largely compiled by manual processes. When insurance adjusters and underwriters deploy and use the systems described herein, immediate access is provided from their remote offices to detailed current data from vehicles insured by their companies. This data set can be accessed directly from the server having an application host running a special insurance application configured to serve the precise information that insurance underwriters and adjusters need. Some information relating to vehicle use remains private with respect to the vehicle's owner and driver, however, by agreement with insurance companies, a vehicle owner may decide to make available and submit particular information in consideration for preferred insurance rates. In this situation, the server of these systems provides an application, addressable by insurance underwriters, to deliver information that insurance companies can use to manage risk.

In addition, insurance underwriters will find another advantage in using of the system of the present invention. The mere presence of a vehicle event recorder system has a very strong effect on drivers wishing to keep their jobs. Mere knowledge that a detailed video record will be available to fleet managers in case of incident keeps driver behavior in check. Thus, even placebo systems arranged to appear functional but in fact totally inoperable will provide insurance underwriters with a great advantage. However, where a fully operable system is deployed, insurance underwriters will be in far better position to manage risk more precisely.

Insurance company workstation computer 66 connected to the internet can communicate with the server computer and employ the web services and applications that are provided specifically for insurance companies. Thus, the server is arranged with particular web applications that insurance companies can use to monitor the vehicles insured by them. In this manner, insurance companies can mitigate their exposure to high risk vehicles and situations. An insurance company can maintain a constant monitoring for changes that might affect their position and can remain highly responsive thereto. Such high access to current information is be a powerful tool for insurance underwriters to develop advanced risk management strategies. Previously, insurance companies had only access to vehicle history records by way of a public authority and clients reporting and history.

These systems of the present invention enable another important management application yielding advantages not only to fleet vehicles, but also to the roadways upon which the vehicles operate. Data collected by these systems includes information about traffic accidents, therefore, computing systems can be set up, whereby a threshold can be triggered to indicate a dangerous condition. For example, if several accidents happen within a short period of time at the same location, this occurrence may be indicative of faulty roadway equipment such as a malfunctioning traffic light. When a threshold is exceeded, the systems of the present invention can be arranged to send an e-mail notice to roadway engineers, notifying them of the dangerous condition. Workstations 67 used by road safety engineers having access to e-mail and the internet may also be connected to the systems of the present invention. Thus, road safety engineers might look to web applications served by the embodiments described herein to provide information related to some particular road safety issue.

For example, if there are fifteen automobile crashes at Fifth and Elm street during the month of July, the server can trigger a message and send it to a road safety engineer. Some condition may have changed at the intersection unbeknownst to the authorities. The message could put the road engineer on alert that something has happened and the intersection has become dangerous. For example, a huge pothole maybe causing cars to swerve just at the moment when drivers need to pay attention to incoming traffic at the intersection.

Another example of how road service engineers might use the systems of the present invention includes the following. To determine the safe speed on a road, some municipalities set a threshold indicator. For example, it may be determined that 85% of drivers drive at or below the "safe speed". In this regard, a system keeping track of vehicle locations and of the speed at which the vehicles are driven may be used to compile information for any particular road stretch and determine what is the safe speed per that section of the road. Road safety engineers can use this information to provide proper signage and road construction elements, such as guard rails, indicators, warnings, etcetera. Some versions can be completely automated and left unattended by human operators. The computer can monitor roadway conditions without input from anyone, and provide appropriate notice when a certain condition is met. Such highly automated systems can prove extremely valuable for general public safety.

Another important application enabled by these systems relates to Departments of Motor Vehicles managed by local authorities, that typically maintain records of traffic accidents and driver behavior.

Since the systems disclosed herein provide highly effective data capture functions, and further provide ready and easy access to such data, a Department of Motor Vehicles may employ these data capture and management systems via a server applications host running a program configured and designed to provide particular types of data. With vehicle event recorder systems arranged as described here, it is now possible for a driver to be involved in a collision at 10 o'clock in the morning, and a video record can be made available at the Department of Motor Vehicles by 10:02 (or before). When a vehicle event recorder is coupled to remote servers as described, and where such remote servers provide need-specific web applications to interested parties, very valuable data handling processes are enabled.

Other workstations 68, similarly having access to the internet, can be used by other users that require information sorted and arranged for their specific application. These users may include entities like vehicle leasing companies. It may be a condition of the lease that the vehicles are used in a safe and proper manner, and a leasing company with access to information provided by these servers through the related web applications can easily check the status of the vehicles it owns.

Very relevant are also applications that relate to vehicle fleet management and administration. Scheduling functions, tracking systems, maintenance operations, etcetera can be organized and provided via computer programs, whereby a human fleet administrator/manager can read and manipulate data with the functionality made possible by systems of the present invention. Thus, a large fleet of vehicles operated in southern California may be maintained and organized by a fleet manager in New York City. With systems according to the present invention, it is no longer the case that the fleet manager has to be situated in the same location as the vehicles, because the systems of the present invention include a highly efficient capture and sorting of information that is provided automatically and directly from fleet vehicles to a remote server, which may be accessed by fleet administrator/managers anywhere.

Maintenance workers might use a particular web application that compiles information relating to wear and tear on the vehicle. Oil changes, tire rotation, wheel alignment, and other general maintenance actions should be performed in view of conditions which can be managed and detected by the server. It is a common practice that oil should be changed every 3000 miles. However, this rule of thumb does not reflect very accurately the conditions upon which oil should really be changed. Oil suffers degradation from many factors, and particularly from excessive heat and high 'rpm'. So the system could set some oil change guidance based on detailed use of the vehicle rather than a simple mileage scheme. If the car runs with high revolutions on many hot days, the oil may need to be changed before 3000 miles. Conversely, if the car is gently driven with low engine stress on mildly cool days, it may not be necessary to change the oil until 4500 miles. Oil changes is a very simplistic example, but is provided here to show that web applications can be used for more accurate guidance in the maintenance of vehicles. Data collected throughout the vehicle service day, recorded and stored, later transmitted to the server, and properly sorted and analyzed by a web application can be read by a maintenance engineer to keep a vehicle in good condition. While fleet management is an application of the embodiment described herein, other interested parties may have a similarly important stake in the fleet vehicle data management systems of the present invention.

Another very important application relates to teenage use of vehicles. Systems are provided for use by families that have new drivers, generally teenagers learning to drive. Teenagers account for a disproportionately large percentage of vehicle accidents, including vehicle accidents that result in deaths. However, when young new drivers know that they are being observed, that their actions will be recorded, and they will be held accountable, better decisions may be made with regard to driving. Thus, parents might be premium subscribers to a service that will benefit them by protecting their children. Special applications can be prepared and delivered by an application host, whereby parents can inquire as to the use of vehicles by their teenagers. Accordingly, families can benefit from reviewing detailed vehicle use information including video data that is easily accessible from the privacy of one's own home by way of an internet server arranged in accordance with these embodiments.

Figure 7:
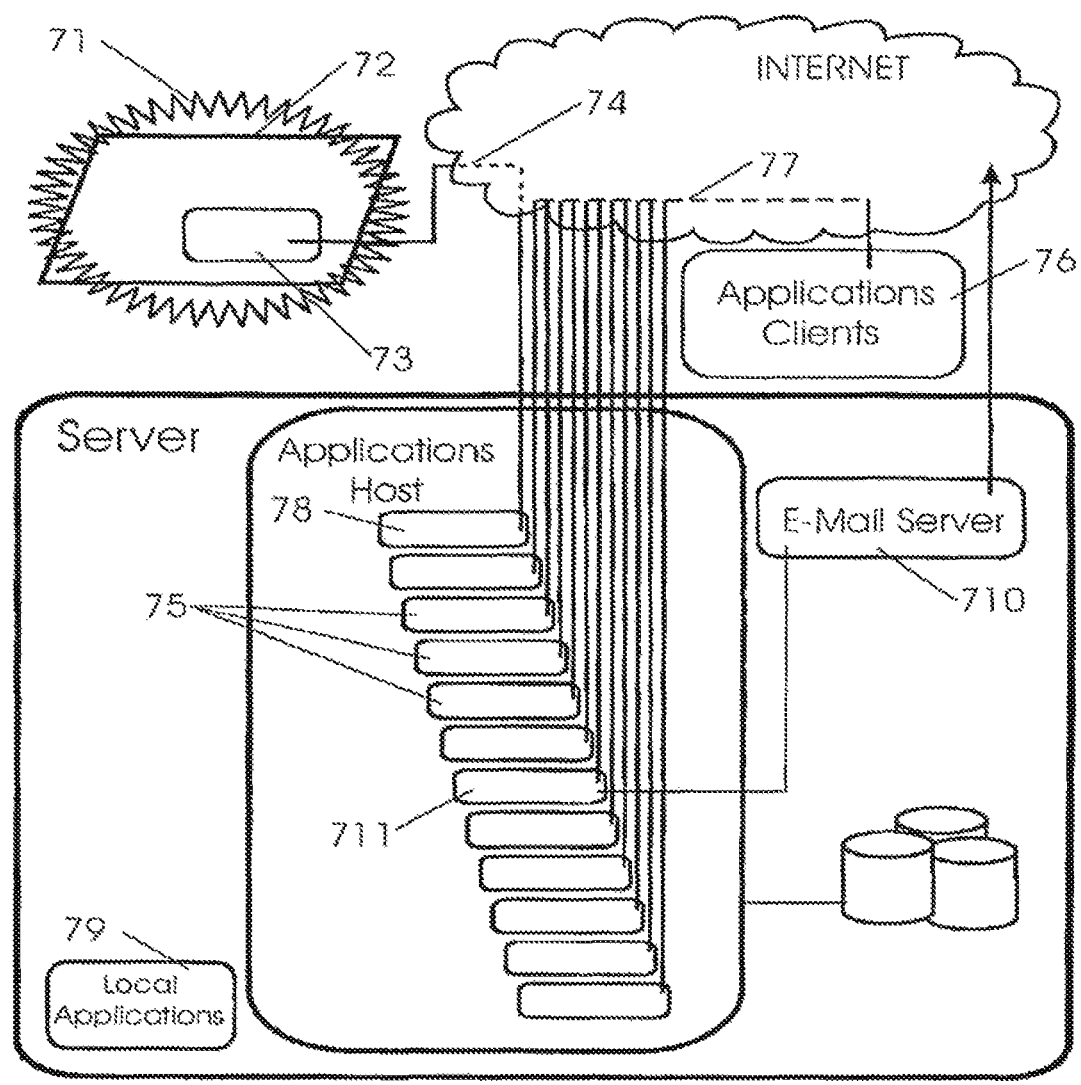
FIG. 7 illustrates examples of a system server and illustrates functionality associated therewith.

FIG. 7 shows a block diagram which corresponds to the concept of independent web applications and services provided at a server. Communication space 71 is associated with parking facility 72, such as a common parking lot that is enveloped by a space in which a reliable communications connection can be made via wireless radio 73. Further, broadband connection 74 to the internet couples the communication space 71 to the system server, whereby video data collected at various vehicle event recorders may be transferred to the server.

A server computer is arranged to provide computer services including, but not limited to, a general computational service, a database service, an e-mail service, and a web application service, among others. For the purpose of the present embodiments, a primary function of the server lies within an applications host that may be arranged as a web server, under which a plurality of independent applications 75, or interdependent applications, are executed and served to clients 76 via TCP/IP or other suitable protocol 77. By way of example, the applications host of the server can be deployed as a Microsoft Internet Information Services IIS system. In conjunction with IIS, the Microsoft .Net technologies including the .NET framework and ASP.NET are suitable for providing the web applications and web services described herein.

In a first example, a special application 78 is provided to perform download operations. When a vehicle enters a communication space and toggles a proximity trigger, a service module within the vehicle event recorder makes appropriate calls to the server, and more specifically the applications host, and also to the download application. The download application responds to these calls by executing operations that permit the vehicle event recorder to transfer data to the server for further processing. Thus, one application of an applications host includes a module to communicate and execute transfers with various vehicle event recorders. Other applications, which belong to the same application host, may operate independently of the download module. Further, these other applications may be designed to be addressed by application clients that are not vehicle event recorders, but rather other entities or interested parties.

Thus, the system server includes computer code programming modules in the form of various web applications, each having access to data downloaded from vehicle event recorders. Web applications consumers or web "applications clients" connect to and communicate with these web applications by way of Internet protocol or TCP/IP, by way of example. These web applications, each perhaps independent of any other, provide information exchange function with these application clients.

These systems include application-specific software suitable for fashioning network communications as 'web request' actions and for transmitting those web requests to the server whose network address is known a priori to vehicle event recorder systems. Web requests directed to a specific URL (Uniform Resource Locator, or 'internet address') may be transmitted from the microprocessor of a vehicle event recording unit. These web requests include web requests directed to specific services, which may be provided at a system server and may include software upgrades, registry updates, scheduling information, as well as data download operations. Thus, a vehicle event recorder that has collected data through its service day is in a condition to download that data once it enters a suitable download or communication space and receives its network address assignment to enable communications with the prescribed servers. Servers are 'known' to vehicle event recorder units because their computers are programmed with a predetermined server network address or means of obtaining it dynamically. Further, a vehicle recorder unit computer is programmed to form appropriately designed web requests, so that the recorder unit can properly interact with the web applications and services provided by the server via the application host.

In preferred versions, the vehicle event recorder unit includes special programming, which anticipates available web services. Such programming is suitable for making action requests to the server and is operable for processing returned responses that are in a particular format. Thus, the vehicle event recorder unit is specifically programmed with prior knowledge of services available at the server. Accordingly, vehicle event recorders cooperate together with established proprietary servers.

Some web services provided by servers are not generic and cannot be processed by other computer clients that have no prior knowledge of the available services and of the proprietary interfaces or formats with which responses are returned. Thus, the server is a specially configured to communicate with the vehicle event recorders. The server is also configured to run self contained local applications 79, which may be directed to data analysis and statistical services that operate on collected data without interaction of outside parties.

Another module of the server includes an e-mail server 710 system, which can be arranged to respond to special conditions and events occurring in related applications 711, whereby e-mail messages can be sent on the internet.

Figure 8:
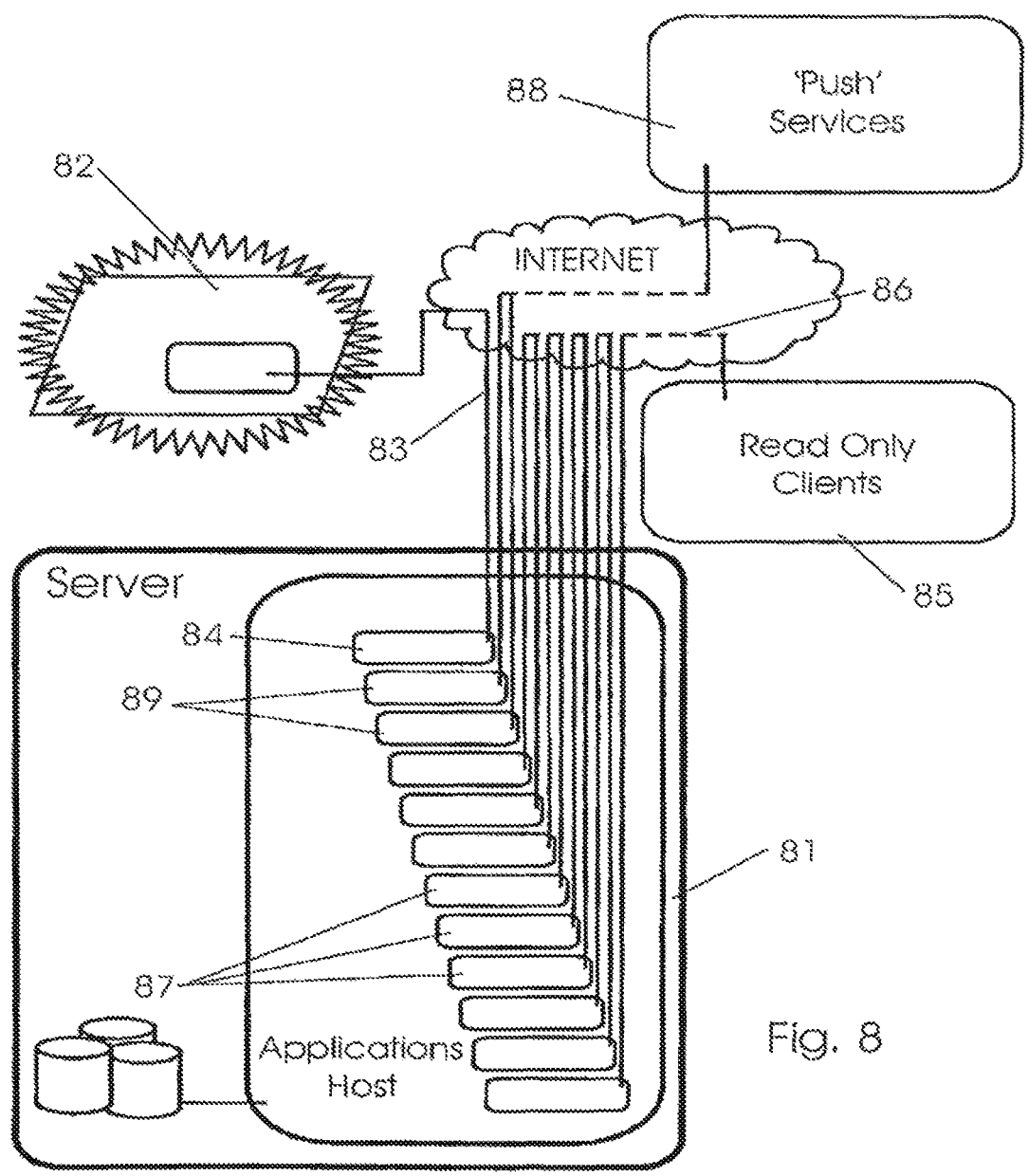
FIG. 8 is a diagrammatic representation of a relationships between entities that interface with a server via networks.

FIG. 8 provides another illustration related to applications of server 81 and to an applications host in accordance with vehicle event recorder systems of the embodiments described herein. Communication space 82, which supports wireless downloads from vehicles having captured video data, is coupled to a remotely located server by way of communication path 83 that may include the internet. The communication space is directly coupled to a web application 84 arranged specifically for communication with vehicle event recorders, whereby it is operable for downloading collected data. The application may be called by vehicle event recorders through a specific network address or URL. Other application clients, such as those described above, may be fashioned as 'read-only' clients 85, whereby the server provides data for analysis and use by interested parties, but those clients do not provide data to the server. These clients each communicate with the application host, by way of various paths 86, which may include unique URLs to appropriately direct communication traffic to the various particular applications 87. An entirely different type of application/service, herein known as a 'push' type service 88, conversely is arranged to provide information to the server. Information from a push service is transmitted by way of the Internet, via explicit URLs or other routing protocol to particular applications 89 arranged to receive information.

Push services may provide information to applications that process this type of information and respond thereto by amending are augmenting certain records maintained by the entire system. For example, information from weather reporting agencies may be transmitted to these applications. The applications then sort and process the weather information, taking important pertinent parts, for example, weather conditions in certain areas at a certain time may be associated with a particular accident recorded by a vehicle event recorder.

Other push services may include those that contain information from vehicle manufacturers, including include updates related to particular model vehicles which may be part of a vehicle fleet. In response to receiving such information, managers can alter the way they use and deploy these vehicles. Vehicle recall information may be transmitted that enables a fleet manager to respond by applying an appropriate fix as part of an automated maintenance program.

Figure 9:
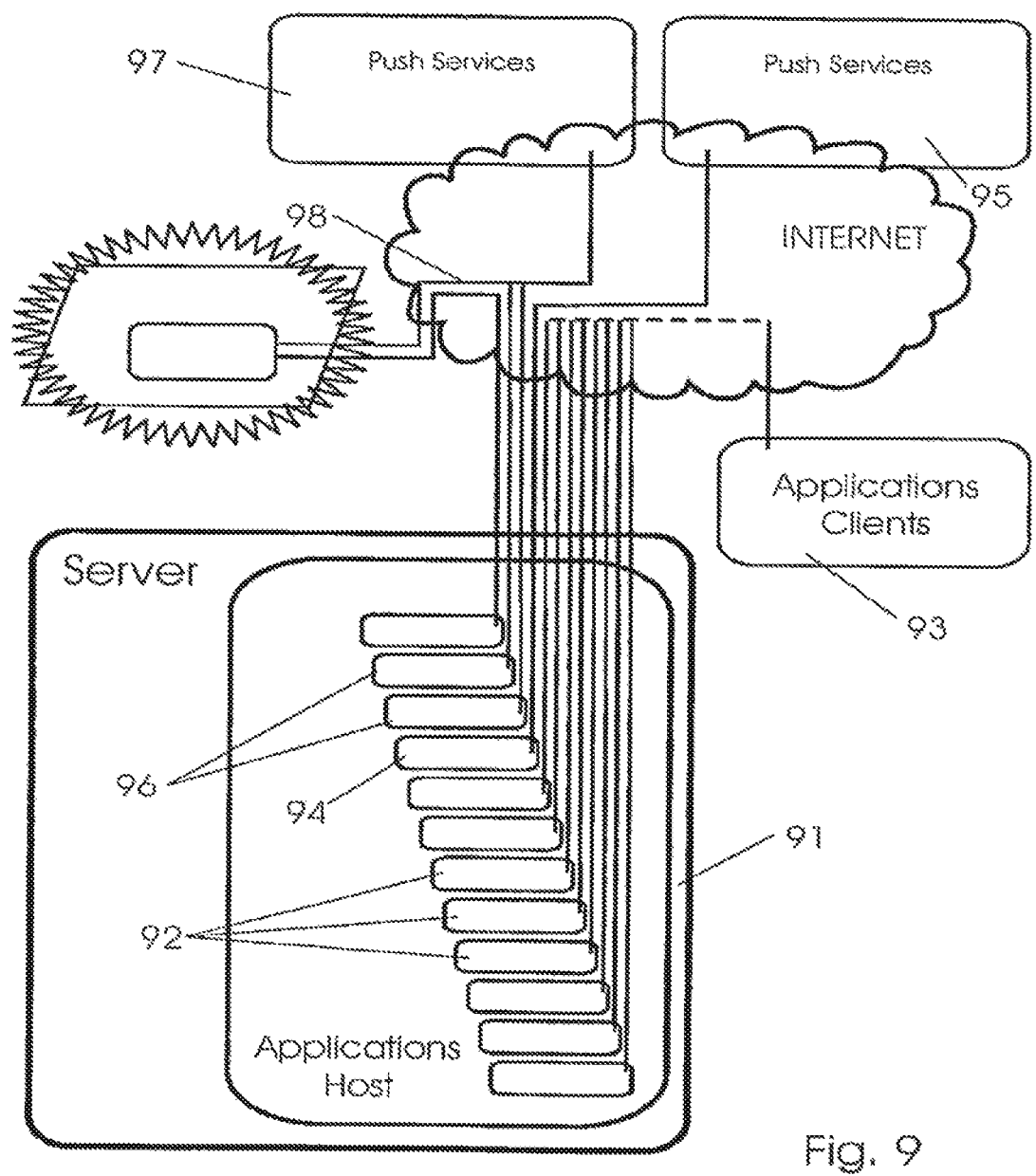
FIG. 9 shows a relationship paths between network entities, vehicle event recorders and related servers.
Figure 10:
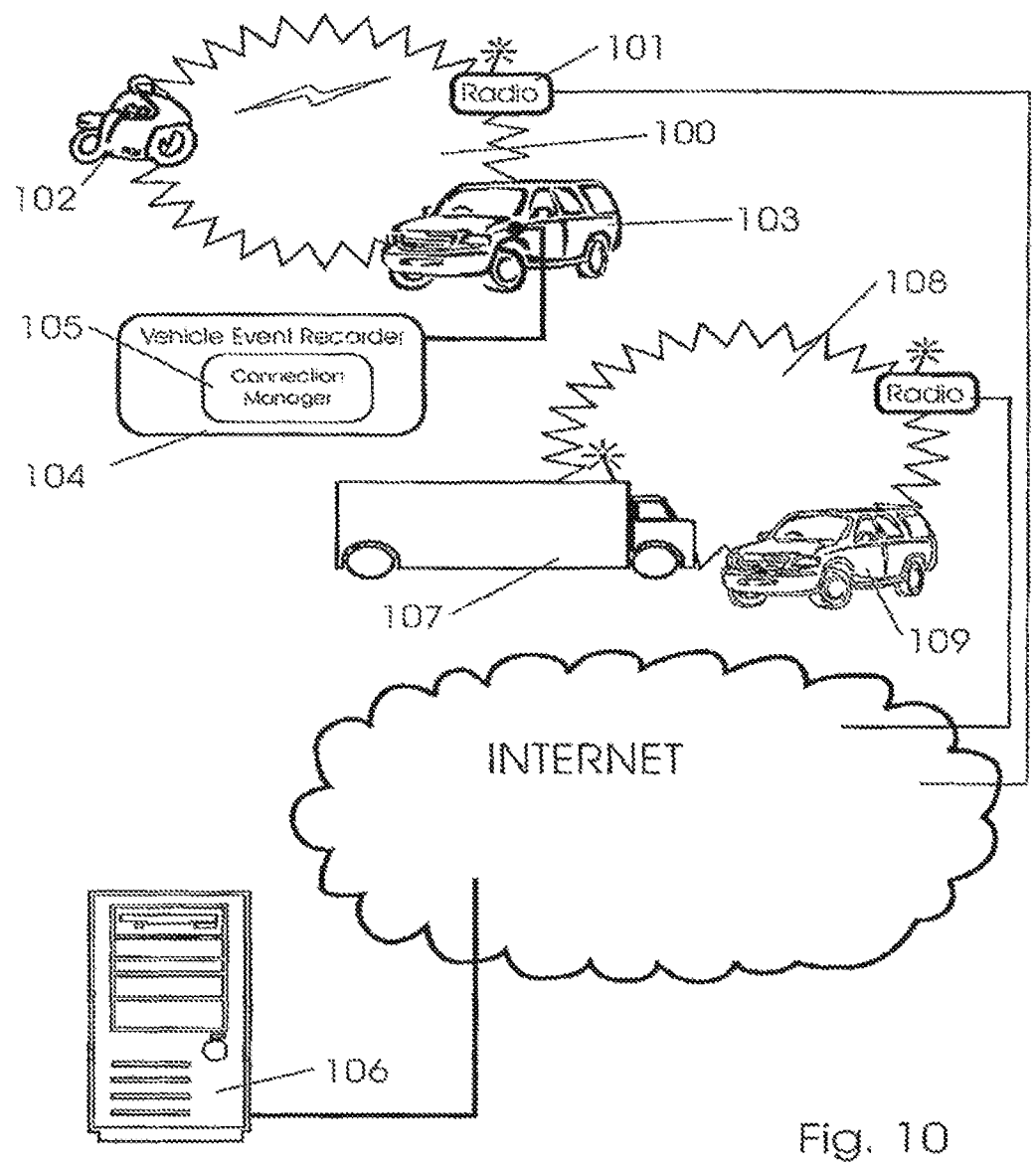
FIG. 10 illustrates a system having a plurality of download spaces related to a single server.

FIG. 9 describes push services of two different types that are arranged with various network connections. System server 91, including specially designed applications 92 in communication with various interested party applications clients 93, also includes specially arranged application 94, which receives information from push service 95. In addition to this arrangement, other applications 96 are configured to communicate with push services 97, whereby information may be received over the internet while at the same time push services 97 can provide information directly to vehicle event recorders over communication path 98.

These systems anticipate not only push services that are in communication directly with the server applications host, but also, at the same time, push services that are in communication directly with vehicle event recorder head units, without first passing through any applications at the server.

A principle of the vehicle event recorder systems described herein includes the arrangement where a single server provides management and service to a plurality of independent fleets.

Independent fleets of vehicles managed by separate entities may share a single server having a common applications host. While fleet members log-on with separate identities, the separate fleets may log-on to the same application host which is provided with powerful membership management facility to maintain separation between various fleets and associated data received from members of the fleet.

A first fleet is associated with communication space 100 served by wireless radio 101 to communicate with fleet members 102 and 103. A vehicle event recorder 104 deployed within the fleet member includes connection manager 105. Connection manager 105 includes computer programming code to properly identify and authenticate the vehicle as a member of a particular fleet when in communication with centralized server 106. A separate fleet may include truck vehicle 107 as a member, in a separate communication space 108 which is physically removed from communication space 100. Should vehicle 109 from the first fleet enter the communication space associated with another fleet, the condition may be designated as a non-authorized condition. In this event, communications and downloads would be prevented. Thus vehicle event recorders of these embodiments include connections managers appropriately suited to manage membership operations and distinguish between vehicles of particular fleets and communication spaces designated for authorized download operations.

Figure 11:
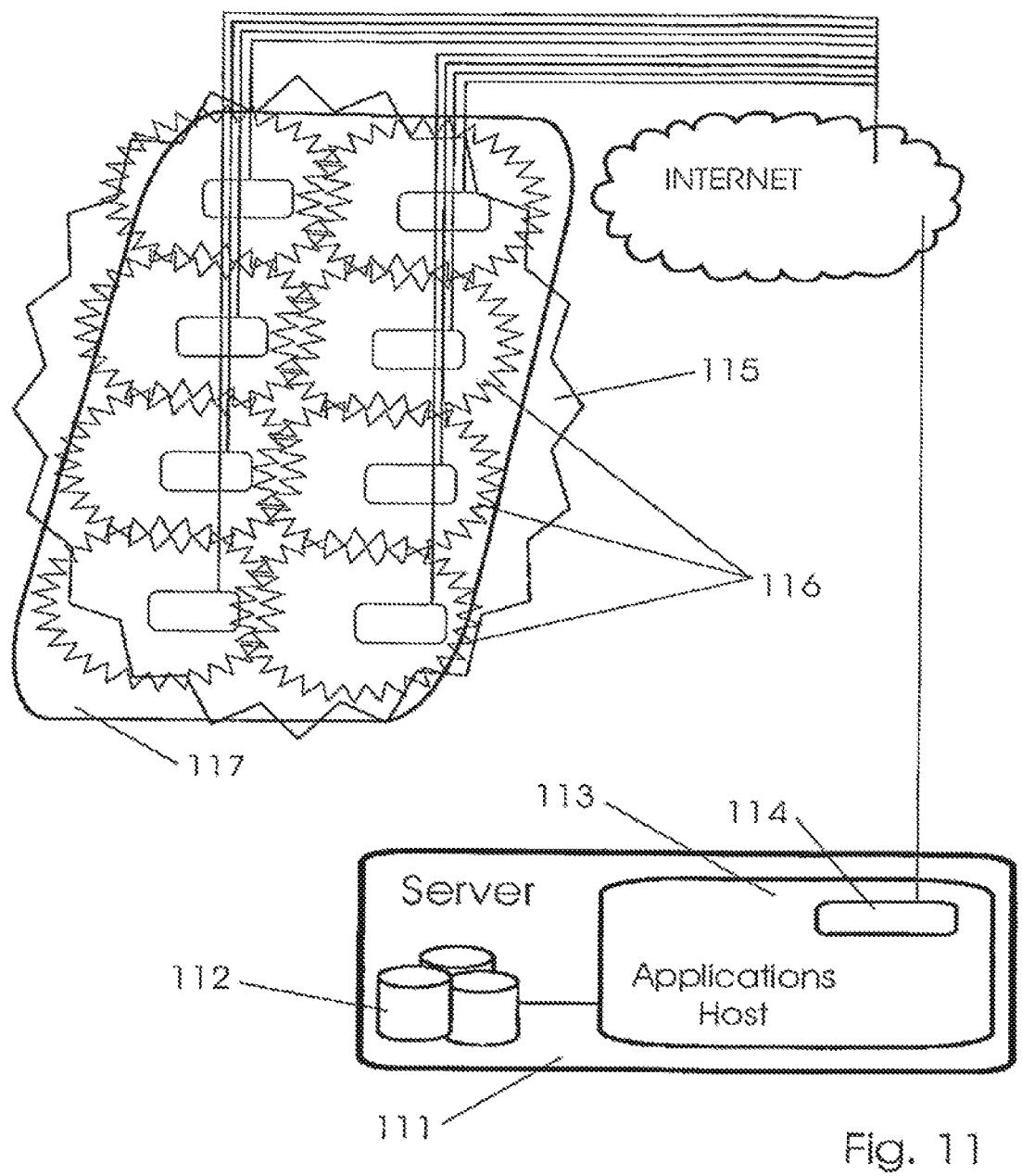
FIG. 11 illustrates fields associated with a scheme to enlarge a download space.

FIG. 11 illustrates communication spaces and the networks which may exist within a single communication space. Since the size of vehicle fleets in use may exceed hundreds of vehicles, it may be necessary to arrange a communication space which is quite extensive. In these situations, it is impossible to serve a communication space that could accommodate the entire fleet of hundreds of vehicles with a single radio transmitter of the WiFi type, because these transmitters have limited ranges not compatible with the parking facilities required to accommodate large fleets. Accordingly, it is a single parking facility of a large area can be served by a plurality of WiFi transmitters networked together. FIG. 11 shows remote server 111, including database 112, application host 113, and at least one web application 114 coupled to the internet and further to extended communication space 115. Communication space 115 is comprised of a plurality of individual communication spaces 116 spatially removed but overlapping one another to operate in conjunction with each other to service an extended and large parking facility 117.

Figure 12:
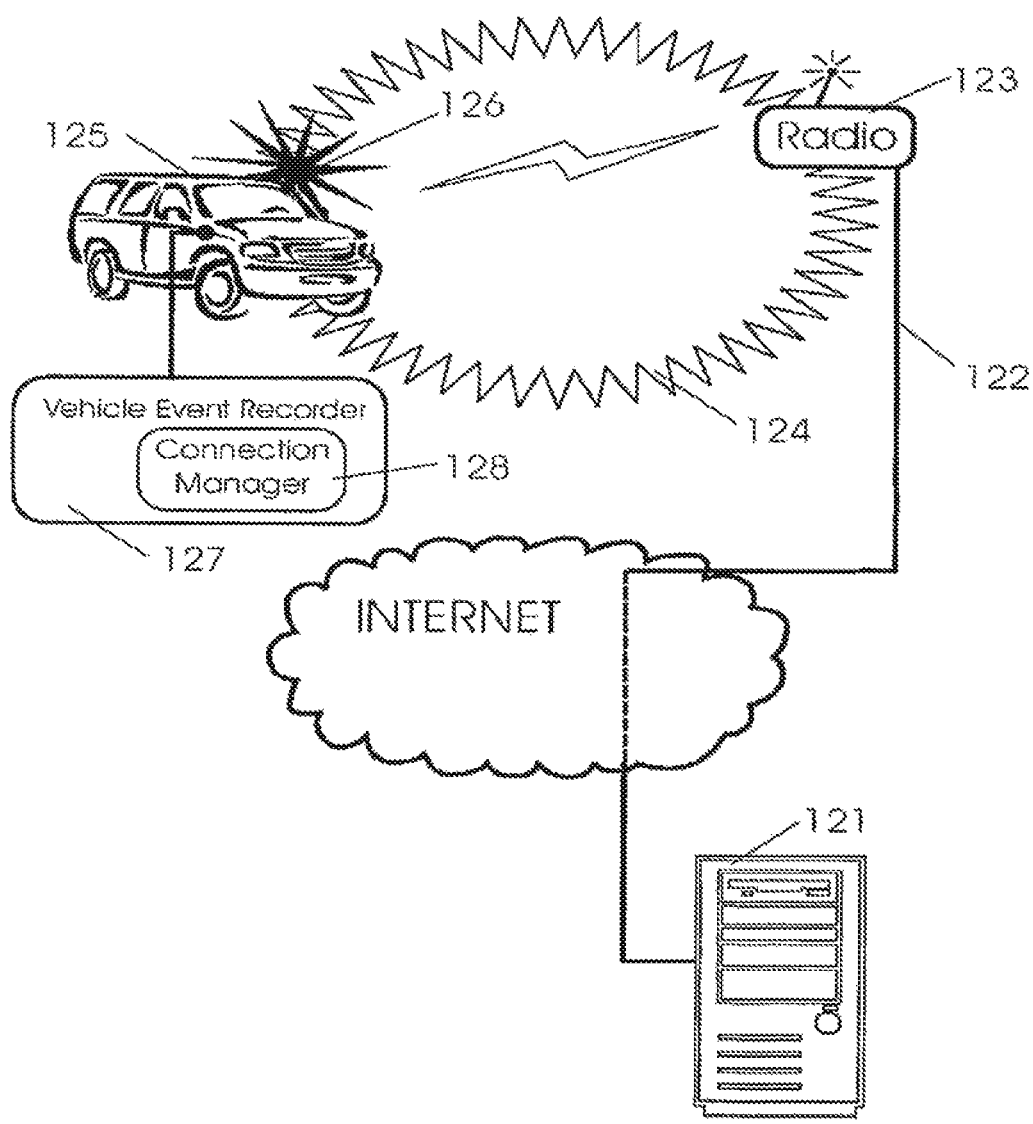
FIG. 12 illustrates a proximity trigger which sets into motion a function of the systems of the present invention.

FIG. 12 illustrates the proximity trigger. By entering the communication space and piercing the envelope of the radio transceiver range boundary, the vehicle causes the proximity trigger to be toggled. Server 121 is in broadband communication 122 with radio transceiver 123 serving communication space 124. Moving vehicle 125 transits from outside of the communication space to the interior of same communication space to cause proximity trigger 126 to be activated. Upon detection of the proximity trigger being toggled, vehicle event recorder 127 equipped with connection manager 128 responds by providing handshaking and authentication with the radio transceiver and further performs a download function, in which data is passed to the remote server in direct response to the vehicle entering the download space.

Thus, the actions of vehicles trigger and cause network responses without intervention of human operators. The arrangement of these systems provides an automated means of passing video data collected in vehicle event recorders to remotely located servers for further processing.

While some wireless communications systems, such as WiFi and WiMax systems, have a large bandwidth, wireless telephone networks do not. Since vehicle event recording systems tend to capture data in extremely large amounts, wireless telephone networks are sometime not suitable for this application. However, systems can be arranged whereby only a select or 'abbreviated' dataset is passed over the wireless telephone network.

It is easy to appreciate that some types of data are well-suited for transmission over low bandwidth communication links that can cover a large area. On the contrary, transmission of high-resolution, live video is may be difficult. On the other hand, where a system is devised such that an abbreviated set of video images is occasionally transmitted, the wireless telephone network may operate reasonably well as a communications link in these systems.

In a first illustrative example, an event recorder duly writes data to a local storage in accordance with the operation described herein. This set of data, extremely large in quantity, is suitable for local storage but not for transmission over the bandwidth of limited wireless telephone type networks. Data written to the local storage could be subject to a download action when the vehicle returns for high-bandwidth communications link. However, while connected via a wireless telephone communications network, the system can be arranged to transmit bandwidth limited subsets of data including selected video frames.

Non-video data recorded by the system may be suitable for continuous transmission. Non-video data can be very small in size and easily transmitted over low bandwidth communications links. For example, a numeric, position-only measurement data may result in a dataset that is quite small and easily transmitted via a mobile phone network. Thus, a vehicle event recorder system which captures a position measurement can be arranged to transmit that type of information over the bandwidth-limited communications link into the system network.

An abbreviated video sequence may include a video sequence that can be detected by some preset mechanism. For example, an 'impact detector' might trigger a transmission of a limited amount of video data, for example three seconds of video prior to the impact and up to three seconds after the impact. This limited dataset might not be transmitted in real-time, but it can be transmitted within a reasonable time and passed to the server while a vehicle is still in the field.

Systems arranged to download data as described, i.e. in limited datasets, may be deployed with mobile telephone networks as a communication link. In such cases, an alternative trigger system may be employed.

In the situation where fleet vehicles never rest or 'park', a download station may operate as one in which a vehicle merely enters, performs a download and then leaves without a full parking, stopping, or storage action.

While embodiments of the invention are described above, it will be apparent to one skilled in the art that various changes and modifications may be made. The appended claims are intended to cover all such changes and modifications that fall within the true spirit and scope of the invention.

The invention claimed is:

1. A system configured to manage a fleet of vehicles, wherein the fleet of vehicles includes a first vehicle and a second vehicle, the system comprising:
   a web browser interface presented to a user on a workstation, wherein the workstation is separate and remote from the fleet of vehicles; and
   a server configured to communicate via a network, wherein the server includes one or more processors configured via instructions to:
      receive vehicle information via the network from a first vehicle event recording unit associated with the first vehicle, wherein the first vehicle event recording unit includes a first internal web server module and a first video camera, wherein the first video camera is configured to capture, responsive to a first detection of a first vehicle event, video images of a first environment about the first vehicle during the first vehicle event, wherein content of the video images as captured by the first video camera is controlled by first video camera image control settings, wherein vehicle event detection by the first vehicle event recording unit is controlled by first settings, wherein the first video camera image control settings include settings for one or more of a first brightness and/or a first contrast, wherein the vehicle information from the first vehicle includes the video images of the first environment and information related to operation of one or more of vehicle lights of the first vehicle, a first engine of the first vehicle, a first drive train of the first vehicle, a first transmission of the first vehicle, and/or vehicle brakes of the first vehicle, and wherein the first internal web server module is configured to provide a first communications connection with the web browser interface;
      receive vehicle information via the network from a second vehicle event recording unit associated with the second vehicle, wherein the second vehicle event recording unit includes a second internal web server module and a second video camera, wherein the second video camera is configured to capture, responsive to a second detection of a second vehicle event, video images of a second environment about the second vehicle during the second vehicle event, wherein content of the video images captured by the second video camera is controlled by second video camera image control settings, wherein the second video camera image control settings include settings for one or more of a second brightness and/or a second contrast, wherein vehicle event detection by the second vehicle event recording unit is controlled by second settings, wherein the vehicle information from the second vehicle includes the video images of the second environment and information related to operation of one or more of vehicle lights of the second vehicle, a second engine of the second vehicle, a second drive train of the second vehicle, a second transmission of the second vehicle, and/or vehicle brakes of the second vehicle, and wherein the second internal web server module is configured to provide a second communications connection with the web browser interface;
      receive, from the user at the workstation, first user input through the web browser interface that is presented to the user at the workstation;
      adjust, based on the received first user input, the first settings and the first video camera image control settings, wherein adjustment of the first settings and the first video camera image control settings is communicated to the first internal web server module of the first vehicle event recording unit via the network, and wherein the adjustment of the first video camera image control settings includes adjusting one or more of the first brightness and/or the first contrast based on the received first user input through the web browser interface;
      receive, from the user at the workstation, second user input through the web browser interface that is presented to the user at the workstation; and
      adjust, based on the received second user input, the second settings and the second video camera image control settings, wherein adjustment of the second settings and the second video camera image control settings is communicated to the second internal web server module of the second vehicle event recording unit via the network, and wherein the adjustment of the second video camera image control settings includes adjusting one or more of the second brightness and/or the second contrast based on the received second user input through the web browser interface.

2. The system of claim 1, wherein the vehicle information from the first vehicle is based on a vehicle on-board data system including one or more sensors configured to generate output signals conveying vehicle feedback information.

3. The system of claim 1, wherein the first vehicle event recording unit further includes a radio transceiver configured to communicate to the server via the network.

4. The system of claim 1, wherein the first video camera has a first field-of-view that includes the first environment about the first vehicle.

5. The system of claim 1, wherein the video images of the first environment about the first vehicle during the first vehicle event include images of a driver compartment of the first vehicle.

6. The system of claim 5, wherein the driver compartment of the first vehicle is illuminated by infrared illumination.

7. The system of claim 1, wherein receipt of the vehicle information from the first vehicle event recording unit is initiated upon establishment of a wireless link between the first vehicle event recording unit and the network.

8. The system of claim 7, wherein the wireless link is automatically established when the first vehicle enters a communication space having boundaries defined by network coverage.

9. The system of claim 8, wherein the wireless link includes a WiFi connection.

10. A method for managing a fleet of vehicles, wherein the fleet includes a first vehicle and a second vehicle, the method comprising:

receiving vehicle information via a network from a first vehicle event recording unit associated with the first vehicle, wherein the first vehicle event recording unit includes a first internal web server module and a first video camera, wherein the first video camera captures, responsive to a first detection of a first vehicle event, video images of a first environment about the first vehicle during the first vehicle event, wherein content of the video images captured by the first video camera is controlled by first video camera image control settings, wherein vehicle event detection by the first vehicle event recording unit is controlled by first settings, wherein the first video camera image control settings include settings for one or more of a first brightness and/or a first contrast, wherein the vehicle information from the first vehicle includes the video images of the first environment and information related to operation of one or more of vehicle lights of the first vehicle, a first engine of the first vehicle, a first drive train of the first vehicle, a first transmission of the first vehicle, and/or vehicle brakes of the first vehicle, wherein the first internal web server module provides a first communications connection with the web browser interface;

receiving vehicle information via the network from a second vehicle event recording unit associated with the second vehicle, wherein the second vehicle event recording unit includes a second internal web server module and a second video camera, wherein the second video camera captures, responsive to a second detection of a second vehicle event, video images of a second environment about the second vehicle during the second vehicle event, wherein content of the video images captured by the second video camera is controlled by second video camera image control settings, wherein vehicle event detection by the second vehicle event recording unit is controlled by second settings, wherein the second video camera image control settings include settings for one or more of a second brightness and/or a second contrast, wherein the vehicle information from the second vehicle includes the video images of the second environment and information related to operation of one or more of vehicle lights of the second vehicle, a second engine of the second vehicle, a second drive train of the second vehicle, a second transmission of the second vehicle, and/or vehicle brakes of the second vehicle, wherein the second internal web server module provides a second communications connection with the web browser interface;

presenting a web browser interface to a user on a workstation, wherein the workstation is separate and remote from the fleet of vehicles;

receiving, from the user at the workstation, first user input through the web browser interface that is presented to the user at the workstation;

adjusting, based on the received first user input, the first settings and the first video camera image control settings, wherein adjustment of the first settings and the first video camera image control settings is communicated to the first internal web server module of the first vehicle event recording unit via the network, and wherein the adjustment of the first video camera image control settings includes adjusting one or more of the first brightness and/or the first contrast based on the received first user input through the web browser interface;

receiving, from the user at the workstation, second user input through the web browser interface that is presented to the user at the workstation; and adjusting, based on the received second user input, the second settings and the second video camera image control settings, wherein adjustment of the second settings and the second video camera image control settings is communicated to the second internal web server module of the second vehicle event recording unit via the network, and wherein the adjustment of the second video camera image control settings includes adjusting one or more of the second brightness and/or the second contrast through the web browser interface.

11. The method of claim 10, wherein the vehicle information from the first vehicle is based on a vehicle on-board data system including one or more sensors that generate output signals conveying vehicle feedback information.

12. The method of claim 10, wherein the first vehicle event recording unit further includes a radio transceiver that communicates to the server via the network.

13. The method of claim 10, wherein the first video camera has a first field-of-view that includes the first environment about the first vehicle.

14. The method of claim 10, wherein the video images of the first environment about the first vehicle during the first vehicle event include images of a driver compartment of the first vehicle.

15. The method of claim 14, wherein the driver compartment of the first vehicle is illuminated by infrared illumination.

16. The method of claim 10, wherein receiving the vehicle information from the first vehicle event recording unit is initiated upon establishment of a wireless link between the first vehicle event recording unit and the network.

17. The method of claim 16, wherein the wireless link is automatically established when the first vehicle enters a communication space having boundaries defined by network coverage.

18. The method of claim 17, wherein the wireless link includes a WiFi connection.

* * * * *